United States Patent [19]

Nakano et al.

[11] Patent Number: 5,418,875
[45] Date of Patent: May 23, 1995

[54] ADAPTER FOR OPTICAL CONNECTOR HAVING FLOAT-TYPE SLEEVE HOLDER AND PANEL FITTING FOR MOUNTING THE SAME

[75] Inventors: Toshiaki Nakano, Kawasaki; Hiromasa Okamura, Tokyo; Shin-Ichi Iwano, Mito; Ryo Nagase, Iruma; Kazunori Kanayama, Tokyo; Yasuhiro Ando, Houya; Akira Kawahara, Kokubhaji; Toshiaki Furukawa, Hatioji; Tateomi Matumoto, Chigasaki; Takashi Nighiyama, Yokohama, all of Japan

[73] Assignees: Honda Tsushin Kogyo Co., Ltd.; Nippon Telegraph & Telephone; Sanwa Denki Kogyo Co., Ltd.; Hirose Electric Co., Ltd., all of Tokyo, Japan

[21] Appl. No.: 114,959

[22] Filed: Sep. 1, 1993

[30] Foreign Application Priority Data

Sep. 4, 1992 [JP] Japan ............... 4-068545 U
Sep. 4, 1992 [JP] Japan ............... 4-068546 U
Sep. 4, 1992 [JP] Japan ............... 4-263155

[51] Int. Cl.6 .............. G02B 6/00; G02B 6/36
[52] U.S. Cl. ...................... 385/77; 385/88
[58] Field of Search ............ 385/60, 70, 77, 88

[56] References Cited

U.S. PATENT DOCUMENTS 4,699,458 10/1987 Ohtsuki et al. ............ 385/60 X
4,895,425 1/1990 Iwano et al. ............... 385/60
4,936,662 6/1990 Griffin ....................... 385/77
5,121,454 6/1992 Iwano et al. ............... 385/60

OTHER PUBLICATIONS

Japanese Information Standard, F04 Type Connectors for Optical Fiber Cords, 1990, Japanese Standards Association.

Primary Examiner—Akm E. Ullah
Attorney, Agent, or Firm—Ostrager, Chong & Flaherty

[57] ABSTRACT

An adapter for an optical connector including securing first and second adapter elements which are opposed to each other and a sleeve holder having an alignment sleeve therein, which is sandwiched between said adapter elements, wherein each adapter element has a seat which is in contact with part of the sleeve holder for sandwiching said sleeve therebetween, the sleeve holder has a pair of metallic sleeve holder elements, one of the sleeve holder elements being pressure fitted to the other sleeve holder element so that it will not be moved relative the other sleeve holder element, the sleeve holder has on the periphery thereof in the intermediate position along the length thereof a flange which is complimentary in shape with the seat of each adapter element.

27 Claims, 24 Drawing Sheets (a)

(b)

ADAPTER FOR OPTICAL CONNECTOR HAVING FLOAT-TYPE SLEEVE HOLDER AND PANEL FITTING FOR MOUNTING THE SAME

BACKGROUND OF THE INVENTION (a) Field of the Invention

The present invention relates to an adapter for the optical connector for connecting optical fibers and, in particular, to an adapter for the optical connector comprising a pair of adapter elements which face to each other and a sleeve holder having an alignment sleeve therein, which is disposed between the adapter elements and a panel fitting for securing the adapter to a panel for wiring optical fibers of communication lines by a single operation.

(b) Description of Related Art

Optical connectors are adapted to connect optical fibers by positioning the optical fibers in the center of cylindrical ferrules and inserting the ferrules into a hollow cylindrical alignment sleeve having precisely manufactured inner diameter to abut the terminal of the ferrule on the terminal of the other ferrule.

The alignment sleeve has been heretofore loosely fitted in a pair of sleeve holders which are identical in shape. The sleeve holders are not press fitted or not bonded to each other, but may be slightly moved independently of each other and is loosely fitted in a pair of housings. The housings are secured to each other by various methods such as screwing, caulking, ultrasonic welding to form an adapter for the optical connector. Examples of the securing methods are as follows:

FIGS. 29(a) and 29(b) show an adapter for the optical connector which connects a pair of optical fibers by conventional screwing. The adapter 10 has a pair of housings 11. Each housing 11 has a flange 11a adjacent to the abut face thereof. The flange 11a of one housing 11 is formed with a screw through-hole and the flange 11a of the other housing 11 is formed with a threaded hole. Both housings are fastened to each other by two screws 12. A sleeve holder 13 is loosely fitted in each of tile housings 11. An alignment sleeve 14 extends through a pair of the sleeve holder 13. The alignment sleeve 14 is formed with a fine slit(not shown) which extends in an axial direction. The ferrules of the plugs which are attached to the terminals of the optical fibers inserted into the alignment sleeve 14 from the opposite sides thereof.

A clearance 15 is provided between the sleeve holders 13 and the alignment sleeve 14. Accordingly, even if the ferrules are inserted into the alignment sleeve 13 in a misalignment manner, the alignment sleeve 14 can bring two ferrules into an alignment relation within the clearance 15.

A reinforcing member (not shown) which is called as plug housing is generally provided along the periphery of the ferrule in order to prevent the misalignment of the ferrules from occurring in the above mentioned adapter. Even if a torsional force which is normal to the axis of the plug is applied to the plug, the force could be absorbed by the pair of housings 11 to some extent. Even if a force which is larger to tilt the ferrules is applied, the alignment sleeve 14 and the ferrules could be correspondingly displaced within the clearance 15. This maintains the contact between the terminals of the optical fibers so that any losses of light will not take place.

The above mentioned adapter 10 for the optical connector can be mounted on an external device such as a panel P for wiring optical fibers of communication lines and the like by means of screws which are screwed into screw holes best shown in FIG. 29(a) where screws 12 are not shown.

FIGS. 30(a) and 30(b) show an adapter for the optical connector for connecting a pair of optical fibers which is assembled by conventional caulking. The adapter 20 includes a pair of housings 21. Each housing 21 has a flange 21a adjacent to the abut face which abuts on the abut face of the other housing 21. The flange 21a of each housing 21 is formed with a through-hole 21b through which a caulking ring extends. As shown in FIGS. 31(a) and 31(b), a spot facing 21c is formed in the vicinity of the exit of the caulking ring through-hole 21b. The caulking ring 22 has a flange at only one end as shown in FIGS. 32(a) and 32(b).

The caulking ring 22 which is shown in FIGS. 32(a) and 32(b) is inserted into the aligned caulking ring through-holes 21b of the flanges 21a which abut to each other as shown in FIG. 30(b) and then the ring 22 is caulked. This causes both housings 21 to be fastened to each other.

The sleeve holders 23 and the alignment sleeve 24 are fitted to the pair of housings 21 generally similarly to the sleeve holders 13 and the alignment sleeve 14 shown in FIG. 29(a).

The above mentioned adapter 20 for the optical fiber connector is mounted on a panel by means of panel fitting 25 with springs 25a, which are adapted into the opposite sides of either housing 21.

FIGS. 33(a) to 33(c) show an adapter for the optical connector which is assembled by ultrasonic welding. The adapter 30 has a pair of housings 31. Each housing 31 has flanges 31a adjacent to the abut face which abuts on face of the other housing 31. The flanges 31a of each housing 31 are formed with screw through holes 31b to which screws are inserted for securing the adapter to the panel P. As shown in detail in FIG. 33(c), the abut faces of the flanges 31a are formed with various concaves and convexes which facilitate precision positioning and connection of both housings 31 by ultrasonic welding.

The sleeve holder 33 and the alignment sleeve 34 are substantially identical in structure to the sleeve holders 13 and the alignment sleeve 14 shown in FIGS. 29(a) and 29(b), respectively and are fitted in the pair of housings 31 in the same manner as the holders 13 and the sleeve 14.

The sleeve holders 33 are loosely fitted in the housings 31 and the alignment sleeve 34 is inserted into a pair of sleeve holder so that it extends therethrough. Then, the abut faces of the pair of housings 31 are exposed to ultrasonic waves to be welded.

The adapter 30 is mounted on a panel P by means of screws (not shown) which extend through screw holes 31b which are formed through the flanges 31a of the housing 31.

Other structures for mounting an adapter for the optical connector on an external device such as a panel for wiring optical fibers of communication lines are shown in FIGS. 34(a), 34(b) and FIG. 35.

In FIGS. 34(a) and 34(b), the adapter 40 has engaging recess 41c extending from the upper faces 41a of the housings 41 to the both sides 41b. A panel fitting 42 having an external shape which is complementary to the engaging recess 41c is fitted therein. The panel P is sandwiched between the flanges 41d of the housing 41 and the spring piece 42a of the panel fitting 42 so that the adapter 40 is secured to the panel P.

FIG. 35 shows a panel fitting for securing an adapter to a circuit board type panel P. In other words, in FIGS. 29 to 34, the optical connectors are adapted to connect a pair of optical fibers which are positioned in both sides of the panel P.

In FIG. 35, a pair of optical fibers which are positioned in one side of a panel P are connected by the optical fiber connector.

As shown in the drawing, a panel fitting 46 has an L-shape. An upright portion 46a of the fitting 46 is secured to an adapter 45 by fastening means 47. A base portion 46b is secured to the panel P by screwing or soldering.

The above mentioned any conventional adapters require a special tool or facility to secure a pair of housings. Some of them require additional parts for securing the adapter.

The adapters which are screwed require screws which are turned by screw drivers. The adapters which are caulked require caulking rings and caulking is carried out by a press and a caulking jig.

Ultrasonic welding requires an expensive ultrasonic wave generator and a positioning jig. In any cases, it takes an extended period of time to complete a housing securing working.

Since the above mentioned prior art adapter requires flange portions which project from the adapter main body, the size of the whole adapter is large and the size of the lateral section which is normal to the axial direction is about 1.5 to 2 times as large as that of the adapter having no flanges.

In the above mentioned any adapters, the pair of housings are secured to each other so that they will not be displaced. Since the pair of sleeve holders in the housings are independent of each other, they are mounted in such a manner that displacement between them may slightly occur.

In a small adapter which can not be provided with a large clearance between the sleeve holders and the alignment sleeve, displacement between the sleeve holders will further narrow the clearance. There is a disadvantage that losses of light may increase even if a small torsional force is applied to the optical connector plug.

Conventional structures for securing such adapters on panels have problems in mounting density. The adapters shown in FIGS. 29 to 34 have flanges for securing a pair of housings. When these adapters are inserted through the panels for mounting, the flanges are brought into an abutment on one side of a panel and are secured thereto by screwing or using panel fittings 25 and 42 shown in FIGS. 30 and 34, respectively. Since the flanges are larger than the panel fittings, the mounting density does not increase. When the conventional adapters as shown in FIG. 35 are to be secured to the panel P, screws holes of flanges are also used for securing it to the panel fitting which is to be mounted on the panel as shown in FIG. 35. In this case, the flanges are large in size, resulting in a large mounting space.

SUMMARY OF THE INVENTION

It is an object of the present invention to provide a compact and economical adapter for the optical connector which overcomes the problems of the above mentioned prior art and is capable of assembling the adapter elements easily and firmly without any special tool or facility.

It is another object of the present invention to provide an adapter for the optical connector in which the force of linking and securing a pair of adapter elements is reinforced.

It is a further object of the present invention to provide an adapter for the optical connector in which the optical transmission is not interrupted by moving the sleeve holders to follow the movement of the plug for maintaining the contact between the terminals of optical fibers even if a torsional force which is large to some extent is applied to the plug of the optical connector.

It is a further object of the present invention to provide an adapter of the optical connector, which is provided with means for firmly linking with a panel fitting to secure the adapter to the panel by means of the panel fitting.

It is a further object of the present invention to provide a panel fitting for the adapter of the optical connector inserted and secured to the panel, which provides a large force of securing between the adapter of the optical connector and the panel fitting and can be easily assembled and provides a large force of securing between the panel fitting and the panel, and is compact in size and is high density mountable even after the panel fitting is secured to the adapter of the optical connector.

It is a further object of the present invention to provide a panel fitting for the adapter of the optical connector secured to the surface of the panel, which provides a large force of securing between the adapter for the optical connector, the panel fitting and the panel and is compact in size and makes it possible to mount the optical connectors at a high density.

It is a further object of the present invention to provide an adapter arrangement for the optical connector having versatility to which either, a panel fitting for inserting and securing the adapter to the panel or panel fitting for securing the adapter on the surface of the panel can be mounted.

In a first aspect of the present invention, there is provided an adapter for an optical connector including first and second identical or non-identical adapter elements which are opposed to each other and a sleeve holder having an alignment sleeve therein which is sandwiched between both adapter elements, wherein each of adapter elements has engaging means which is snap-engaged with that of the other adapter element for securing both adapter elements.

In a second aspect of the present invention, there is provided an adapter for an optical connector for securing first and second adapter elements in an opposing relationship, wherein the abut faces of both adapter elements are formed with press fit holes, said adapter elements being linked to each other by inserting reinforcing pins into the opposing press fit holes.

In a third aspect of the present invention, there is provided an adapter for an optical connector including first and second adapter elements which are opposed to each other and a sleeve holder having an alignment sleeve therein which is sandwiched therebetween, wherein each adapter element has a seat which is in contact with part of the sleeve holder for sandwiching said sleeve holder between the seats, the sleeve holder has a pair of metallic sleeve holder elements, one of the sleeve holder elements being press fitted to the other sleeve holder element so that it will not be moved relative to the other sleeve holder element, the sleeve holder has on the periphery thereof in the intermediate position along the length thereof a flange which is complimentary in shape with the seat of each adapter element.

In a fourth aspect of the present invention, there is provided an adapter for an optical connector which is secured to a panel by means of panel fitting in which said adapter has projections for securing the panel fitting on opposite two sides of the adapter main body which are normal to the faces on which openings are formed.

In a fifth aspect of the present invention, there is provided a panel fitting for securing an adapter for an optical connector to a panel having an opening to which the adapter for the optical connector is inserted for mounting in which said panel fitting has a pair of reversed U-shaped plate members which are combined to sandwich the adapter; and each plate member including securing means for holding and securing the adapter and securing portions which are secured to the panel.

In a sixth aspect of the present invention, there is provided a panel fitting for securing an adapter for an optical connector on a surface of the panel comprising: holding means for holding and securing the adapter; and securing portions disposed at one ends thereof which are secured to the panel.

In a seventh aspect of the present invention, there is provided an adapter for an optical connector comprising a versatile securing means to which either of the panel fittings, a panel fitting which is inserted into the panel and secured thereto or a panel fitting which is secured to a surface of a panel can be secured.

According to the first aspect of the present invention, by snap engaging the engaging means while they sandwich the sleeve holder therebetween, specifically forcing the elastic engaging piece into the recess for bringing the engaging protuberance into engagement with the engaging recess, the pair of the adapter elements are assembled and secured.

Such operation can be easily carried out without using any special facility or tool. Therefore, the cost of the optical connector adapter can be reduced. Since no flanges is required, the whole size of the adapter can be made compact.

The engaging means are snap engaged with each other merely by facing and moving a pair of opposite adapter elements close to each other. This causes the adapter for the optical connector to be easily and firmly assembled and secured to each other, resulting in a remarkable reduction in assembly time.

According to the second aspect of the present invention, the reinforcing pin is inserted into press fit holes which are formed on the abut faces of the first and second adapter elements. Most of the adapter elements are generally made of a synthetic resin. If the strength of securing the first and second adapter elements by snap engagement is insufficient, reinforcing pins compensates for the strength. Combination of snap engagement and the linkage by the reinforcing pins enables the pair of adapter elements to be positively secured.

According to the third aspect of the present invention, the sleeve holder having the alignment sleeve is movably sandwiched between the pair of the adapter elements. Accordingly, the torsional force applied to the plug will not be directly applied to the alignment sleeve and the ferrule. Since the sleeve holder are tilted to follow the movement of the plug, the alignment sleeve and the ferrules positioned in the sleeve holder are less influenced.

Since the pair of the sleeve holder elements which form an outer shell of the sleeve holder are secured so that they are not moved to each other, the clearance between the sleeve holder and the alignment sleeve will not become small. Accordingly, even if the ferrules are tilted in a given range, contact between the terminals of the optical fibers and alignment of the axes of the ferrules is maintained. This enables the optical fibers to be connected to each other without attenuating the transmission of light in the position of the adapter.

According to the fourth aspect of the present invention, the adapter main body is formed with projections for securing the panel fitting on two sides which are normal to faces where openings are formed. The adapter can be secured to or inserted therethrough and secured thereto by fitting the panel fitting to the projections.

According to the fifth aspect of the present invention, the adapter is sandwiched between a pair of reversed U-shaped plate members of the panel fitting and is secured to the panel fitting by securing means. Accordingly, the adapter is firmly secured to the panel fitting. Two opposite sides of the panel fitting secured to the periphery of the adapter are provided with projections and spring pieces or screw holes, by which the adapter is firmly secured to the panel.

According to the sixth aspect of the present invention, the adapter is sandwiched and secured by a panel fitting comprising a pair of reversed U-shaped member, or alternatively press-inserted or engaged and secured by a panel fitting comprising two L-shaped members.

The securing portion of the panel fitting for the panel is provided with the spring hooks which can be elastically inserted and secured to the mounting hole of the panel or screw holes. The adapter can be secured to the surface of the panel by the spring hooks or screws extending through the screw holes.

According to the seventh aspect of the present invention, the adapter is formed on two sides with projections in one or two positions. If the projection is provided in one position, the projection has channels on both sides. This enables either of the panel fittings according to the fifth and sixth aspects to be mounted on one adapter of the optical connector.

DESCRIPTION OF THE PREFERRED EMBODIMENTS

Now, the present invention will be described by way of embodiments of an adapter for the optical connector in detail with reference to the drawings.

Referring now to FIGS. 1(a) and 1(b), there are shown an exploded perspective view of an embodiment of an adapter for the optical connector of the present invention and a perspective view of the adapter of FIG. 1(a) which has been assembled.

The adapter for the optical connector is of the type which connects a pair of optical fiber terminals in with each other. The adapter generally comprises a metallic sleeve holder 50, and a pair of adapter elements 60 made of synthetic resin. The sleeve holder 50 is loosely sandwiched between the adapter elements 60.

Figure 2:
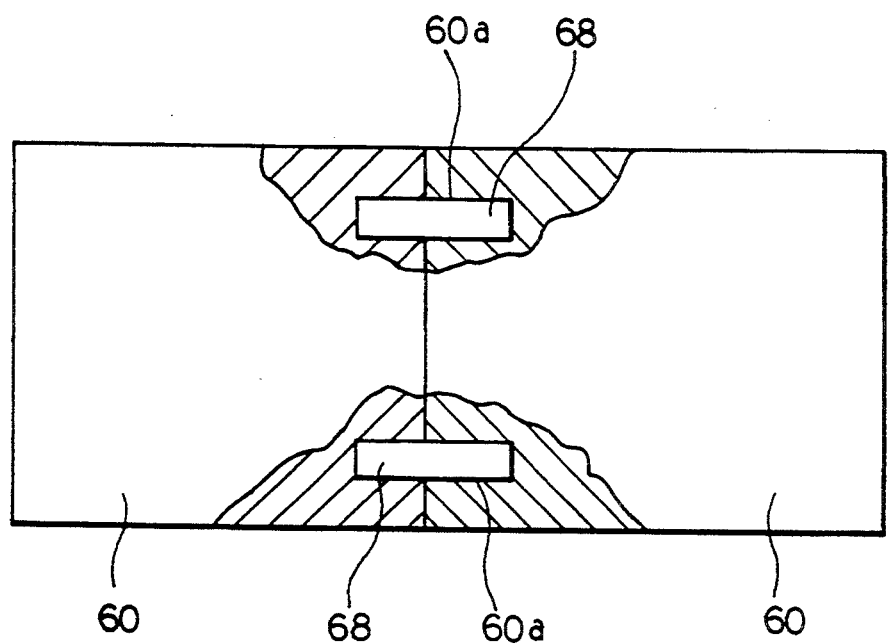
FIG. 2 is a schematic front elevational view partly in section showing the adapter of optical connector comprising a pair of adapter elements which are secured to each other by means of reinforcing pins.
Figure 3A:
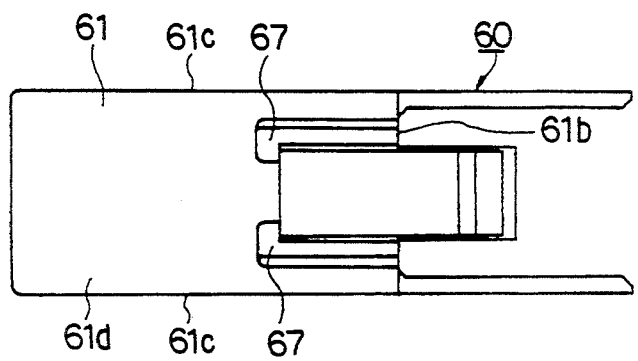
FIGS. 3(a), 3(b), 3(c) and 3(d) are plan, front, rear and right side elevational views, respectively, showing an adapter element which is part of the adapter of FIGS. 1(a) and 1(b)
Figure 3B:
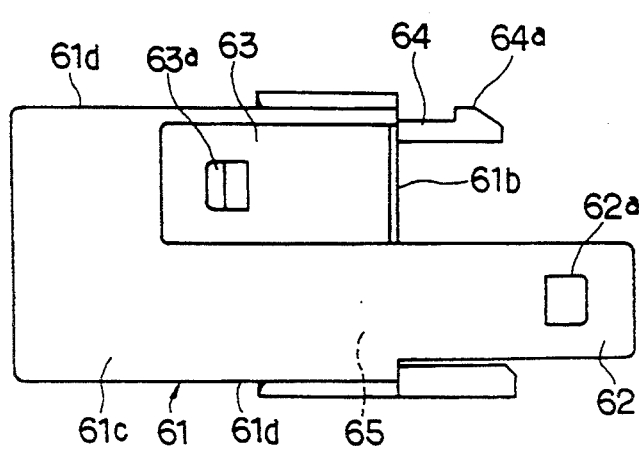
Figure 3D:
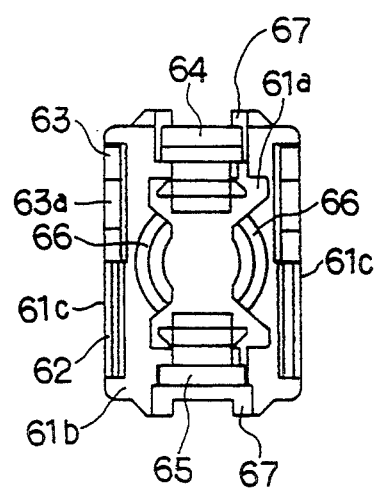
Figure 3C:
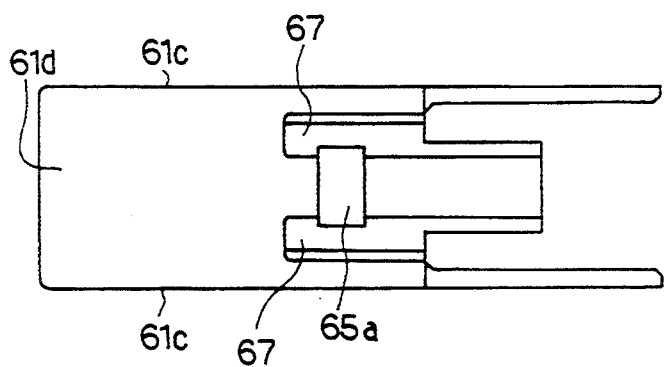

As schematically shown in FIG. 2, holes 60a are formed on the abut faces of the first and second adapter elements 60. Both adapter elements may be linked to each other by pressure inserting metallic reinforcing pins 68 into opposing holes 60a. This provides a sufficient linkage strength when both adapter elements 60 are secured to each other by a snap engaging means which will be described hereafter. This pin and hole linking structure is effective particularly when the snap engaging means can not be provided with a sufficient structural strength.

If the sufficient linkage strength between both adapter elements can be provided, the elements could be linked to each other by only the pressure insertion of the metallic pressure insertion pins into the holes and snap engaging means may be structually omitted.

Referring now to FIGS. 3(a) to 3(d), each of the adapter elements 60 includes a housing 61 having a hollow rectangular tube-like shape. The housing 61 is formed therein with a space 61a to which a plug which will be attached to the terminal of the optical fibers is inserted. The housing 61 has two pairs of opposing sides 61c and 61d which are perpendicular to the abut face 61b which will abut upon that of the other opposing housing 61.

Each of the sides 61c is formed with a leaf elastic engaging piece 62 which projects in an inserting direction toward the opposite housing 61. Each of the sides 61c is formed with a recess 63 which accepts the elastic engaging piece 62 of the other adapter element 60. The elastic engaging piece 62 has a shape which is complementary to that of the recess 63. Accordingly, when the elastic engaging piece 62 of one of the adapter elements 60 is inserted into the recess 63 of the other adapter element 60, the piece 62 is flush with the corresponding side of the other element. This structure enables the pair of the adapter elements to eliminate a play in a direction normal to the inserting direction when the elastic engaging piece 62 of one adapter element 60 is inserted into the recess 63 of the other adapter element 60.

The elastic engaging piece 62 is formed with a square-shaped engaging recess 62a in the vicinity of the front end thereof and the recess 63 is formed on the bottom thereof with an engaging protuberance 63a which will be inserted in the square engaging recess 62a of the elastic engaging piece 62.

The ferrules of plugs attached to the terminals of optical fibers are generally pressed at a force of 6N (0.6 kgf) per ferrule by means of spring. The terminals of the fibers can be brought into firm contact with each other also in this case.

The dimensions such as length and thickness of the leaf elastic engaging piece 62 are chosen depending upon its material so that the piece 62 can be elastically deformed beyond the engaging protuberance 63a of the recess 63 without being broken.

In the illustrated preferred embodiment, the adapter element 60 is further formed with a leaf elastic engaging piece 64 which projects from the other side 61d in an inserting direction and the other adapting element 60 is formed on the corresponding side 61d thereof with a recess 65 to which the elastic engaging piece 64 of the adapter 60 is fitted. The recess 65 and the elastic engaging piece 64 are respectively formed with an engaging recess 65a and an engaging protuberance 64a, which engages with each other when both adapter elements 60 are inserted to each other.

Each of the sides 61d is formed with a pair of ribs 67 on two positions thereof for engaging with a panel fitting which will be described hereafter.

Figure 4:
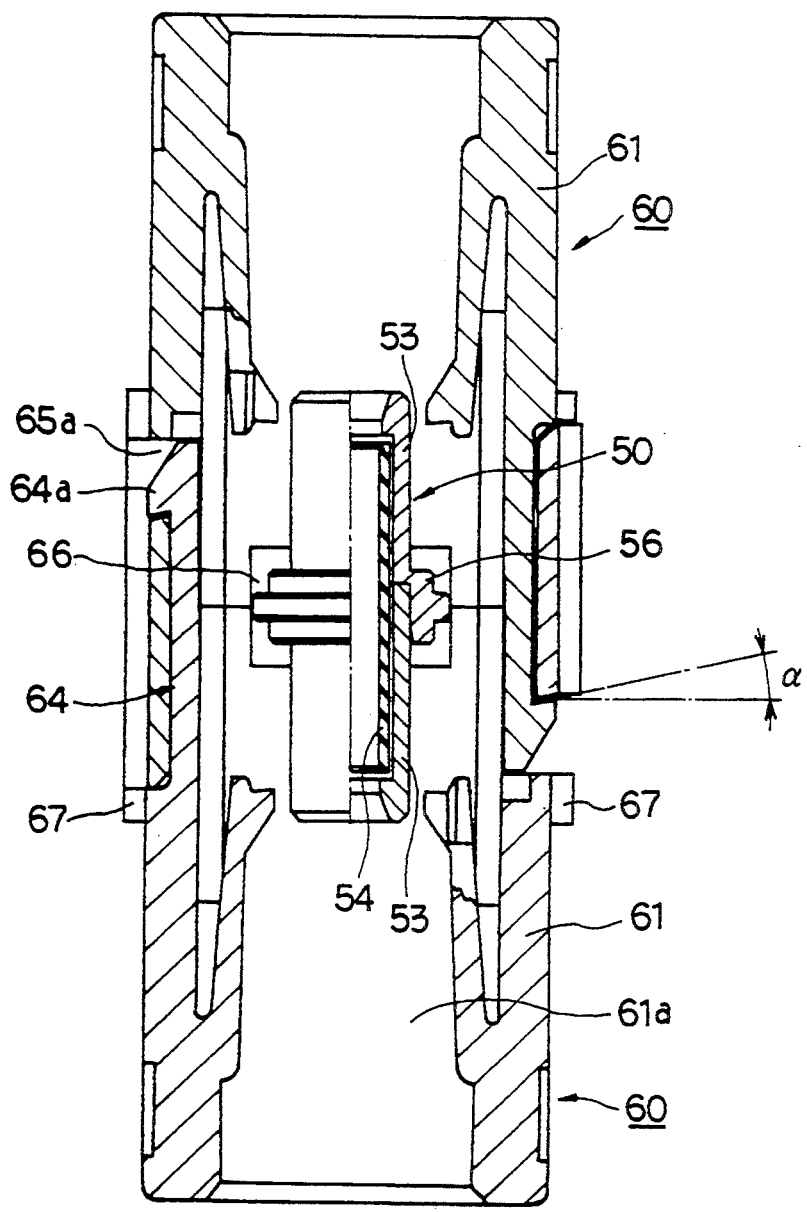
FIG. 4 is a longitudinal sectional view taken along the line A—A in FIG. 1(b)

The abut faces of the engaging recess 65a and the engaging protuberance 64a which are in contact with each other are slightly inclined at an angle α in a biting direction with respect to a face normal to the surface of the elastic engaging piece 64 as illustrated in FIG. 4 in an exaggerated manner. This prevents the engaging protuberance 64a from disengaging from the engaging recess 65a since the engaging protuberance 64a will bite the contact face of the engaging recess 65a even if a force will act on the pair of the adapter elements 60 to separate them away from each other once the engaging protuberance 64a has been engaged with the engaging recess 65a.

In the illustrated embodiment, the connection between the elastic engaging piece 64 and the housing 61 is positioned on the more inner side of the housing 61 in comparison with the elastic engaging piece 62. Accordingly, the length of the elastic engaging piece 64 which extends beyond the abut face 61b is about half of the elastic engaging piece 62. The recess 65 and the elastic engaging piece 64 on the respective sides 61d are provided to make the connection of the pair of adapter elements more firm even when the adapter is made more compact and may be in the various shapes other than the illustrated shape.

The abut face 61b of the housing 61 is provided with a pair of stepped and circle seats 66 which extends into the inside of the housing 61.

Figure 5:
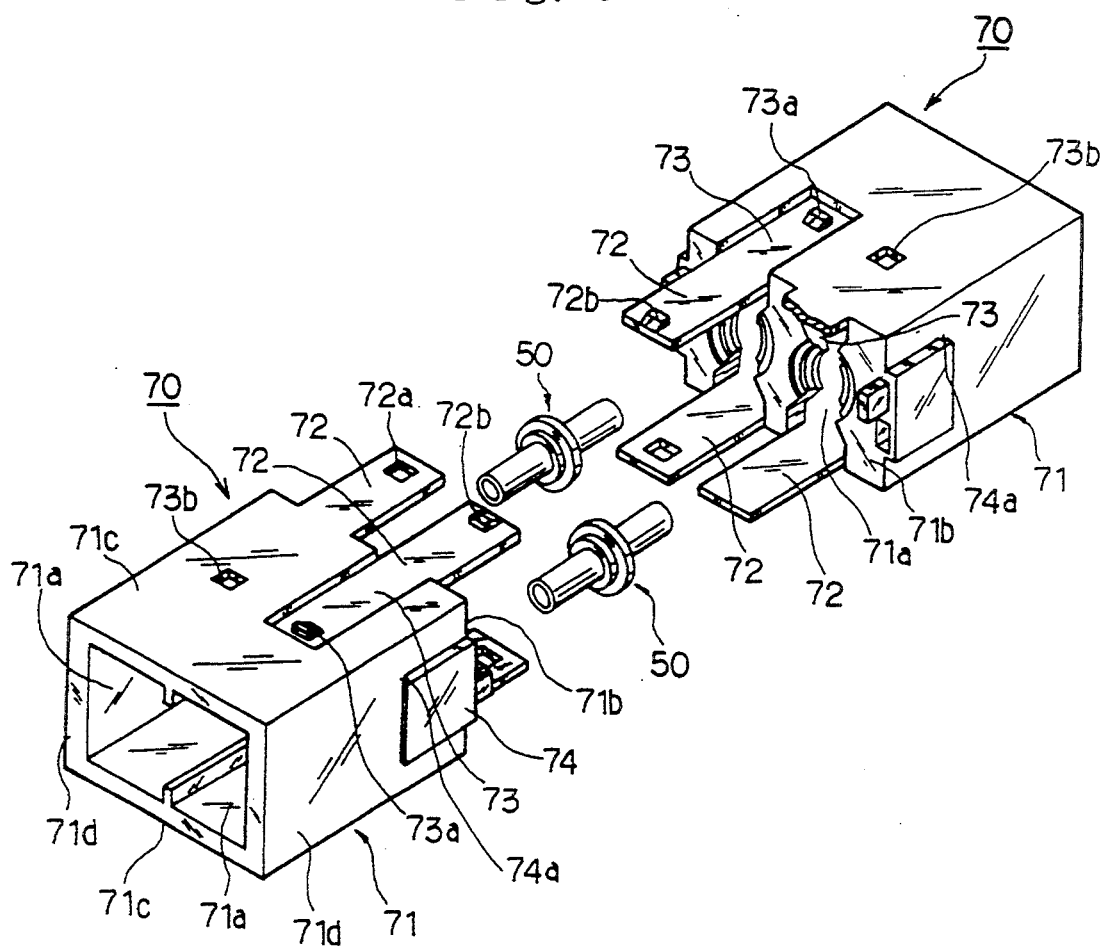
FIG. 5 is an exploded perspective view showing another embodiment of the adapter for the optical connector of the present invention.

Referring now to FIG. 5, there is shown another embodiment of an adapter for the optical connector of the present invention.

The adapter for the optical connector in this embodiment is adapted to connect two pairs of optical fibers with each other.

Each of the adapter element 70 has a rectangular tube-like housing 71 and is formed therein in a parallel relationship two spaces 71a into which two plugs attached to optical fiber terminals are inserted, respectively. The housing 71 has a pair of opposite sides 71c and a pair of opposite sides 71d which are normal to an abut face 71b which will abut on an abut face 71b of the other housing 71.

Each side 71c is formed with two leaf elastic engaging pieces 72 which project in an inserting direction toward the opposite housing 71 in a parallel relationship with each other. One of the elastic engaging pieces 72 is shifted in a downward or thickness direction by a thickness of the piece 72 relative to the other elastic engaging piece 72.

Each side 71a is formed on the upper and lower surfaces thereof with two recesses 73 which accepts elastic engaging pieces 72 of the other adapter element 70 which are formed in parallel relationship. Since the two elastic engaging pieces 72 are shifted in a depth direction, two recesses are correspondingly shifted.

The recess 73 on one housing 71 is complimentary with the elastic engaging piece 72 of the other housing 71 in shape. When an outer side elastic engaging piece 72 of one adapter element 70 is inserted into the upper recess 73 of the other adapter element 70, the upper sides 71c of the housings 71 are flush with each other.

The outer side elastic engaging piece 72 is formed with a square shaped engaging recess 72a in the vicinity of the front end thereof. The upper recess 73 is formed on the bottom thereof with an engaging protuberance 73a which will engaged with the engaging recess 72a of the outer side elastic engaging piece 72 of the opposite adapter element 70. The inner side elastic engaging piece 72 is formed with a square shaped engaging protuberance 72b in the vicinity of the tip end thereof. The lower recess 73 is formed with an engaging recess 73b which will be engaged with the square shaped elastic engaging protuberance 72b of the inner side elastic engaging piece 72 of the other adapter element 70.

In the embodiment shown in FIG. 5, the engaging recesses 72a are engage with the engaging protuberance 73a and the engaging protuberance 72b are engaged with the engaging recesses 73b in total 8 positions when a pair of adapter elements 70 are inserted to each other.

Each of the sides 71d is formed in one position with a projection 74 for engaging a panel fitting which will be described hereafter. Each projection 74 is formed with a channel 74a in the side apart from the mating side 71b. Total 4 channels 74a are formed on both sides 71d of the housing 71.

Figure 6:
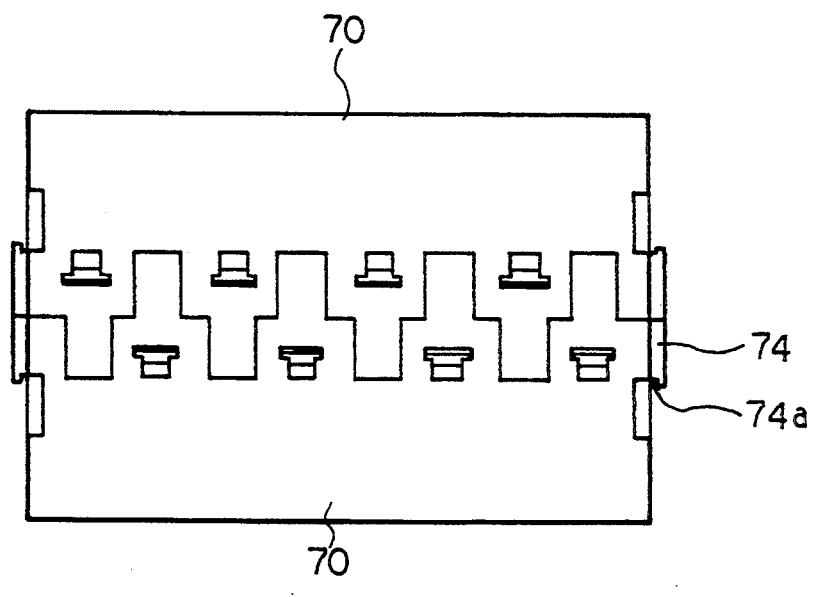
FIG. 6 is a plan view showing a further embodiment of the adapter for the optical connector of the present invention.
Figure 7:
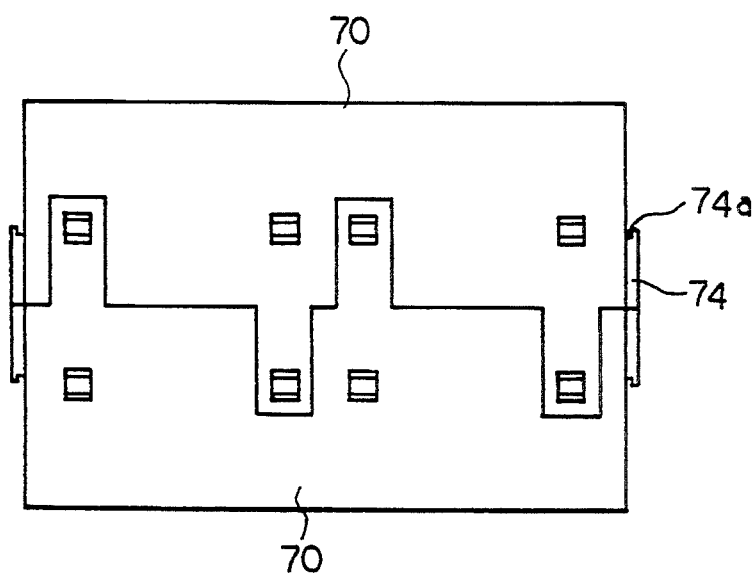
FIG. 7 is a plan view showing a further embodiment of the adapter for the optical connector of the present invention.

Referring now to FIGS. 6 and 7, a further embodiment of an adapter for the optical connector which connects 8 pairs of optical fibers.

Figure 1:
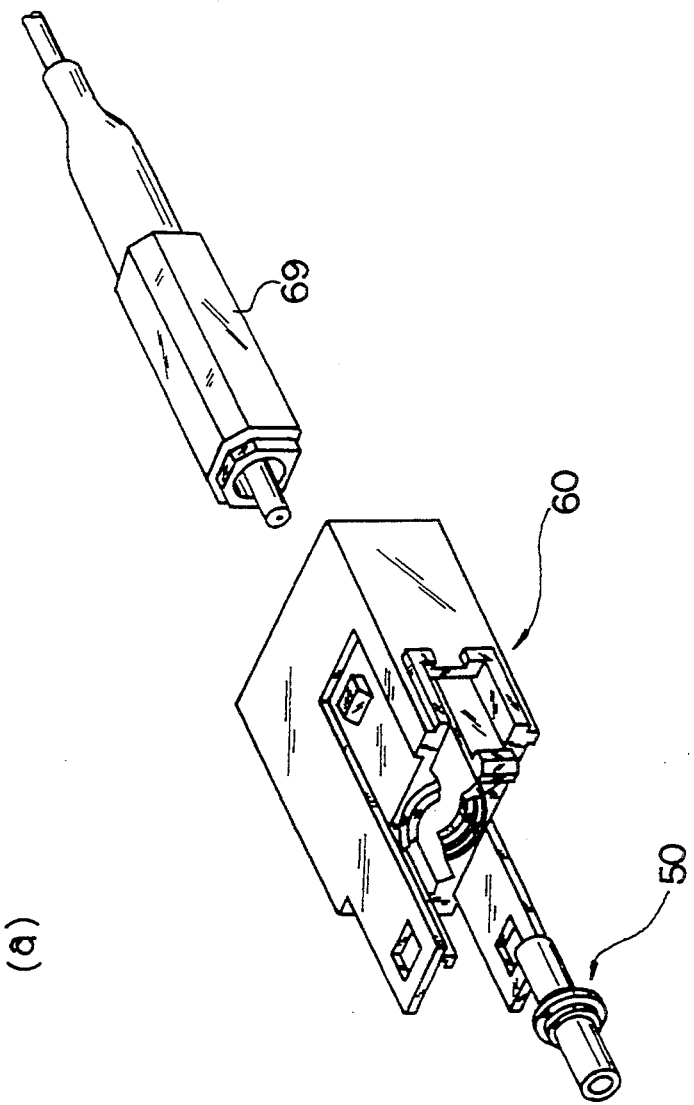
FIGS. 1(a) and 1(b) are an exploded perspective view of one embodiment of an adapter for the optical connector of the present invention and a perspective view showing an adapter for the optical connector which has been assembled, respectively.
Figure 1:
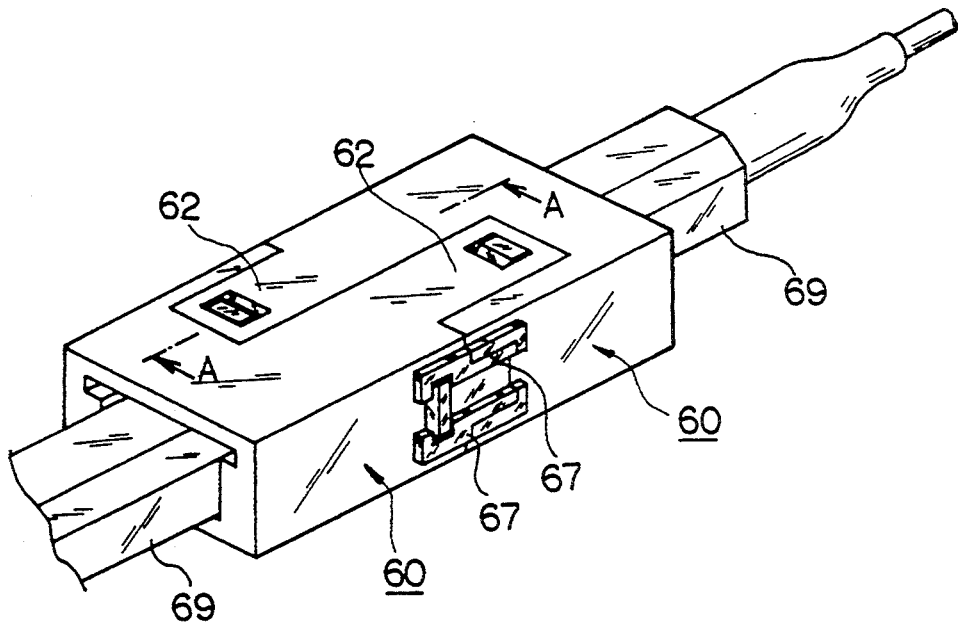

The adapter shown in FIGS. 6 and 7 is substantially identical with the adapter shown in FIGS. 1 and 5 except that the former has a repeated pattern of the latter in a width direction.

Figure 8:
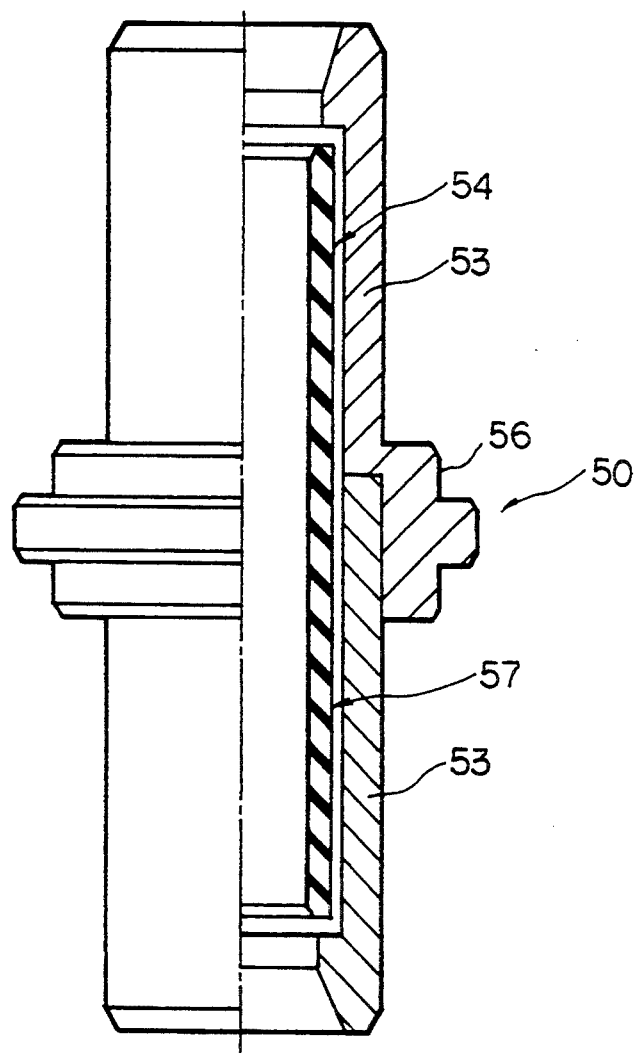
FIG. 8 is a front view half in section showing a sleeve holder shown in FIG. 1(a) and 1(b)

Referring now to FIG. 8, The sleeve holder 50 shown in FIG. 1 is illustrated in detail.

The sleeve holder 50 generally comprises an alignment sleeve 54 and a pair of sleeve holder elements 53 into which the alignment sleeve 54 is loosely fitted with a slight clearance 57.

One of the paired sleeve holder elements 53 is press fitted to the other sleeve holder element 53 so that they will not move individually for forming the sleeve holder 50. The sleeve holder 50 is formed with a stepped flange 56 along the periphery thereof in an intermediate position along the length thereof. The stepped flange 56 is complementary with the pair of the stepped circle seats 66 formed in the inside of each housing 61, Accordingly, when the pair of the adapter elements 60 are inserted to each other, the sleeve holder 50 is loosely fitted between the stepped seats 66 as shown in FIG. 4.

If the ferrules which are inserted into the sleeve holder 50 is tilted, they could be moved in the clearance between the alignment sleeve 54 and the sleeve holder 53 so that separation and misalignment between the terminals of the ferrules can be prevented, If a torsional force is applied upon the plug in a direction normal to the axial direction thereof, the sleeve holder can follow the tilting of the plug since the sleeve holder 50 is loosely fitted in the adapter elements Therefore, even if an excessive torsional force is applied upon the plug, contact between the terminals of the optical fibers is maintained and the alignment of the axes of the ferrules is maintained since the sleeve holder 50 is loosely fitted and the clearance 57 between the sleeve holder 50 and the alignment sleeve 54 will not become narrower by the shift of the sleeve holder 50 than the prior art. Then, light can be transmitted through the fibers without any losses.

Such a structure is effective particularly for adapters for high density mountable and small size optical connector in which a large clearance can not be provided between the alignment sleeve and the sleeve holder.

A panel fitting for securing an adapter for the optical connector to a panel will be described with reference to FIGS. 9 to 26. FIGS. 9 to 19 show a panel fitting 82 for inserting and securing an adapter for the optical connector to an opening formed in a panel (hereinafter referred to as "an insert type panel fitting"), and FIGS. 20 to 26 show a panel fitting 92 for securing an adapter for the optical connector to a surface of a panel. (hereinafter referred to as "a surface mount type panel fitting").

Figure 19:
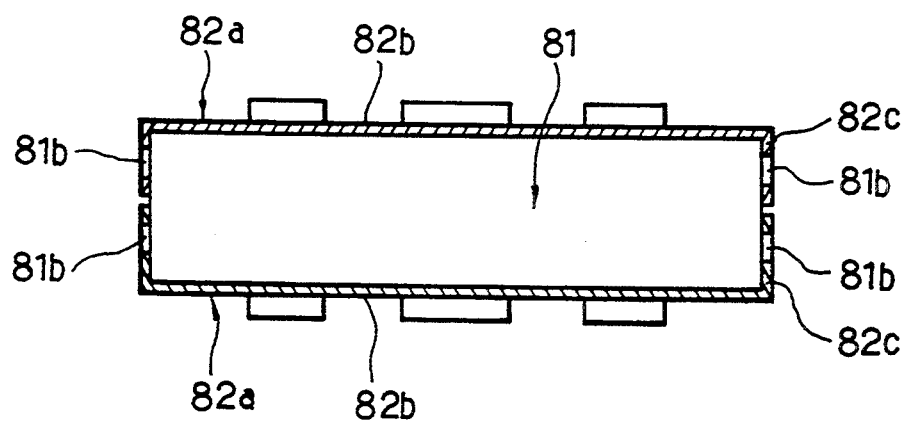
FIG. 19 is a longitudinal sectional view showing a further embodiment of the assembled panel fitting and the adapter for the optical connector.
Figure 26:
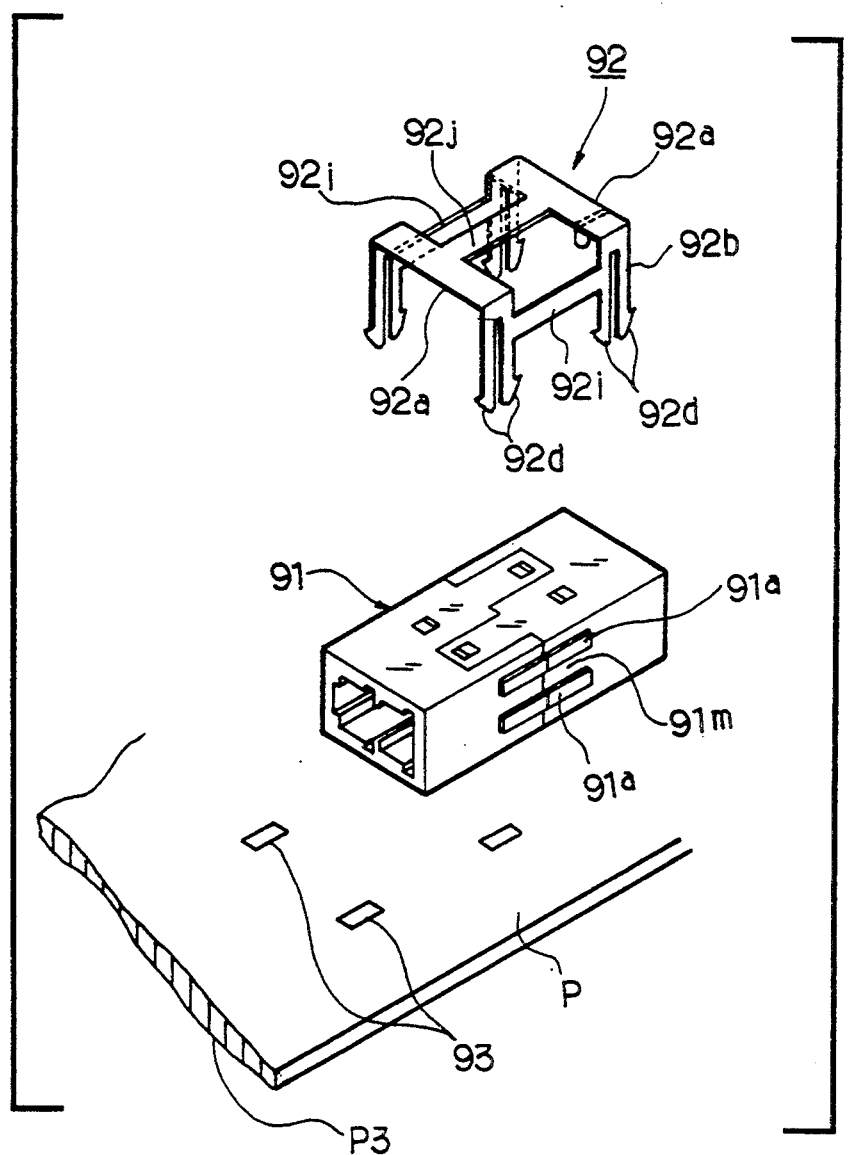
FIG. 26 is an exploded perspective view showing a further embodiment of the panel fitting of the present invention which is used for securing the adapter for the optical connector to the panel.
Figure 35:
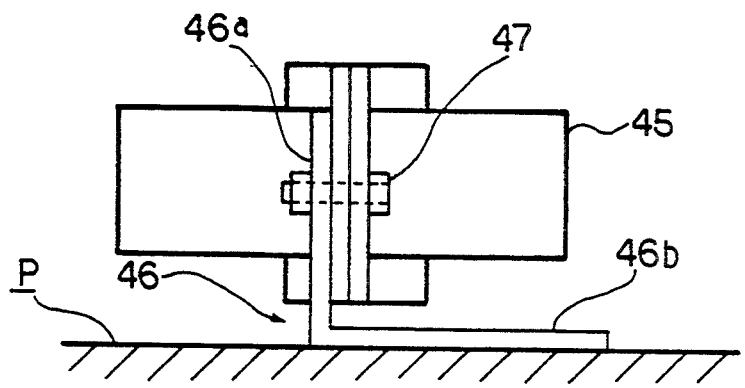
FIG. 35 is a perspective view showing a further structure for securing the adapter for the optical connector to an optical fiber wiring panel.

As for engaging projections by which two kinds of the adapter fitting as described above are secured to the adapter for the optical connectors, the adapters are classified into two types; the first type is an adapter having on one side thereof one engaging projection such as the engaging projection 74 shown in FIGS. 5 to 7, the engaging projection such as engaging projection 81b and the engaging projection 91a shown in FIGS. 20 to 24 and the second type is an adapter on one side having two projections such as the engaging projections 67 shown in FIGS. 1 to 3 and the engaging projections 81b shown in FIG. 19 and the engaging projections 91a shown in FIG. 26.

If the insert type panel fitting and the surface mount type panel fitting are provided, and both types can be engaged with respective one or two engaging projection(s) on the side of the adapter, the adapter for the optical connector (hereinafter referred to as "adapter body") of one kind can be secured to the panel in both manners of mounting, i. e. an insert mounting and a surface mounting. The present invention has an advantage that the adapter body has versatility by provision of such projection(s) on the side of the adapter.

The insert type panel fitting of the above mentioned two panel fittings will be described in detail with reference to FIGS. 9 to 19.

This panel fitting is used for optical connector adapters which connect a pair of optical fibers which are positioned on both sides of a panel which is in an erecting position.

Now, referring to FIGS. 9 to 12, there is shown an embodiment of such a panel fitting.

Figure 9:
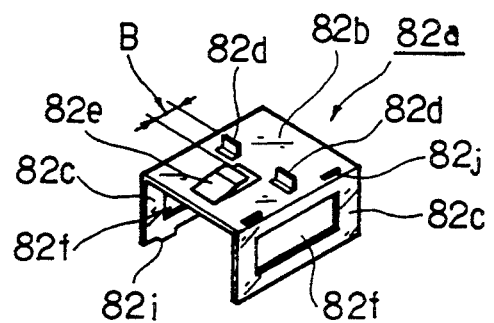
FIG. 9 is an exploded perspective view of a panel fitting for the present invention which is used for securing the adapter of the optical connector to the panel.
Figure 9:
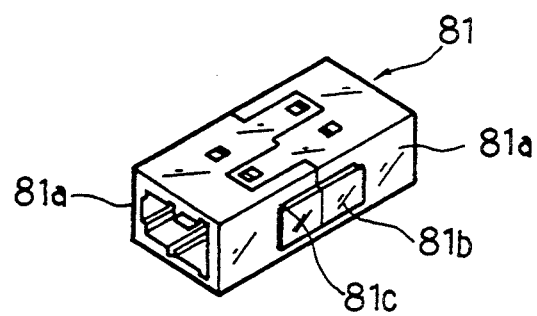
Figure 9:
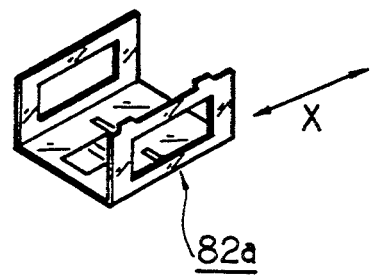
Figure 10:
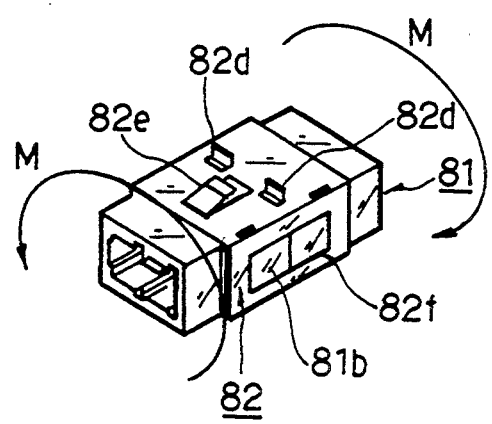
FIG. 10 is a perspective view showing the panel fitting of FIG. 9 which is secured to the adapter for the optical connector.
Figure 11:
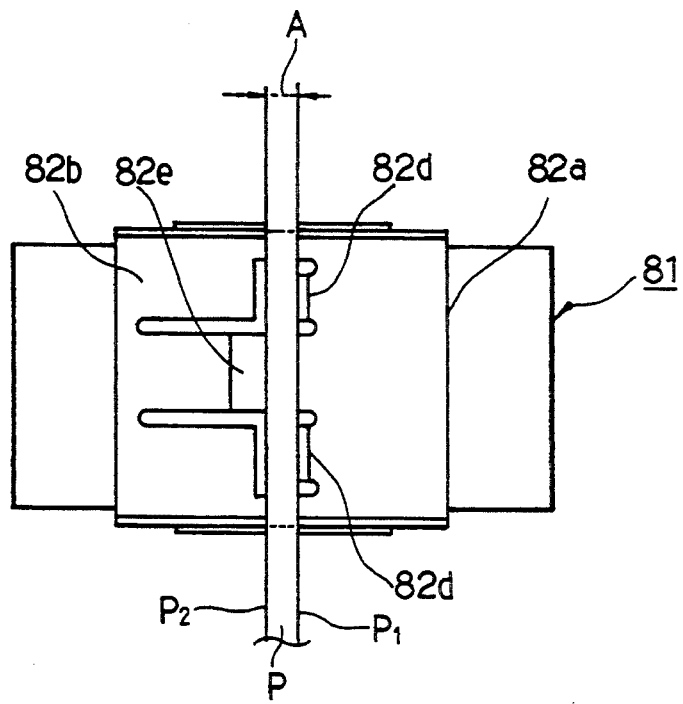
FIG. 11 is an elevational view showing the adapter for the optical connector which is secured to the panel by means of the panel fitting which is shown in FIGS. 9 and 10.
Figure 12:
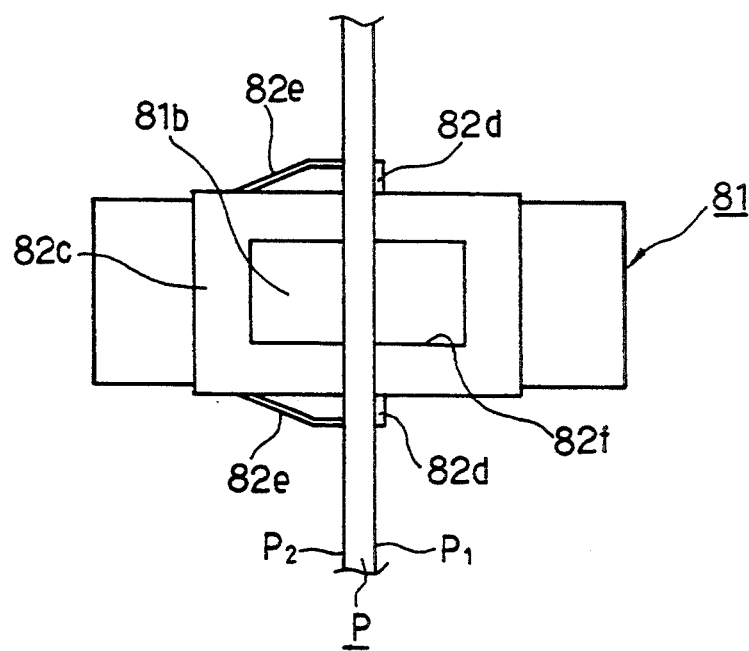
FIG. 12 is a plan view of the adapter for the optical connector shown in FIG. 11.

As is best shown in FIGS. 9 and 10, the panel fitting 82 comprises a pair of plate members 82a which sandwich an adapter 81 therebetween. The plate members 82a are identical with each other in shape and dimension. Each plate member 82a comprises a base 82b which faces an upper or lower side of the adapter 81 and a pair of sides 82c which are formed integrally with both edges of the base 82b.

The base 82b has two aligned projections 82d which abut on the side P1 of a panel P, and a wide spring piece 82e which is formed in a position opposite to the projections 82d and abuts on the opposite side P2 of the panel P. The spacing B between the projections 82d and the spring piece 82e is slightly larger than the thickness A of the panel P (refer to FIGS. 11 and 12).

On the other hand, the sides 82c are formed with fitting recesses 82f for receiving rectangular engaging projections 81b on opposite two sides of the adapter 81.

In the present embodiment, the fitting recesses 82f are rectangular holes which are complimentary with the rectangular engaging projections 81b formed on the sides of the adapter 81. Accordingly, if the reversed U-shaped plate members 82a are pressed into the upper and lower surfaces of the adapter 81, a pair of sides 82c are elastically expanded outwardly and then the engaging projections 81b of the adapter 81 are fitted into the fitting recesses 82f and the sides 82c are returned inwardly to original positions.

In a case where the engaging projection 81b is formed with a channel 81c (corresponding to channel 74a in FIG. 5), a clearance is formed between each plate member 82a and the channel 81c. In order to prevent the plate members from moving in a direction as represented by an arrow X in FIG. 9, each side 82c is formed with a projection 82i on the distal end thereof and the base 82b is formed in corresponding position with a hole 82j for receiving the projection 82i. Since the projection 82i is fitted into the hole 82j when the upper and lower plate members 82a are inserted to each other, movement of each plate member in an X direction in FIG. 9 is restricted. Accordingly, the plate members 82a are firmly secured to the adapter 81. If a torsional force, that is, a moment (in a direction of M in FIG. 10) is applied to the adapter 81, the force is absorbed by the insert portion between the projection 82$i$ and the hole 82$j$. The force which is directly applied to the adapter 81 advantageously becomes less.

In order to more firmly secure the plate members 82$a$ to the adapter 81, the engaging projection 81$b$ may be press fitted into the fitting recess 82$f$.

The projections 82$d$ of the base 82$b$ and the spring piece 82$e$ are formed by cutting and erecting part of the plate member 82$a$. The projections 82$d$ are projected substantially normal to the plate member 82$a$. On the other hand, the spring piece 82$e$ extends from the plate member 82$a$ outwardly in an inclined manner and elastically abuts upon the other face P2 of the panel P.

Figure 17:
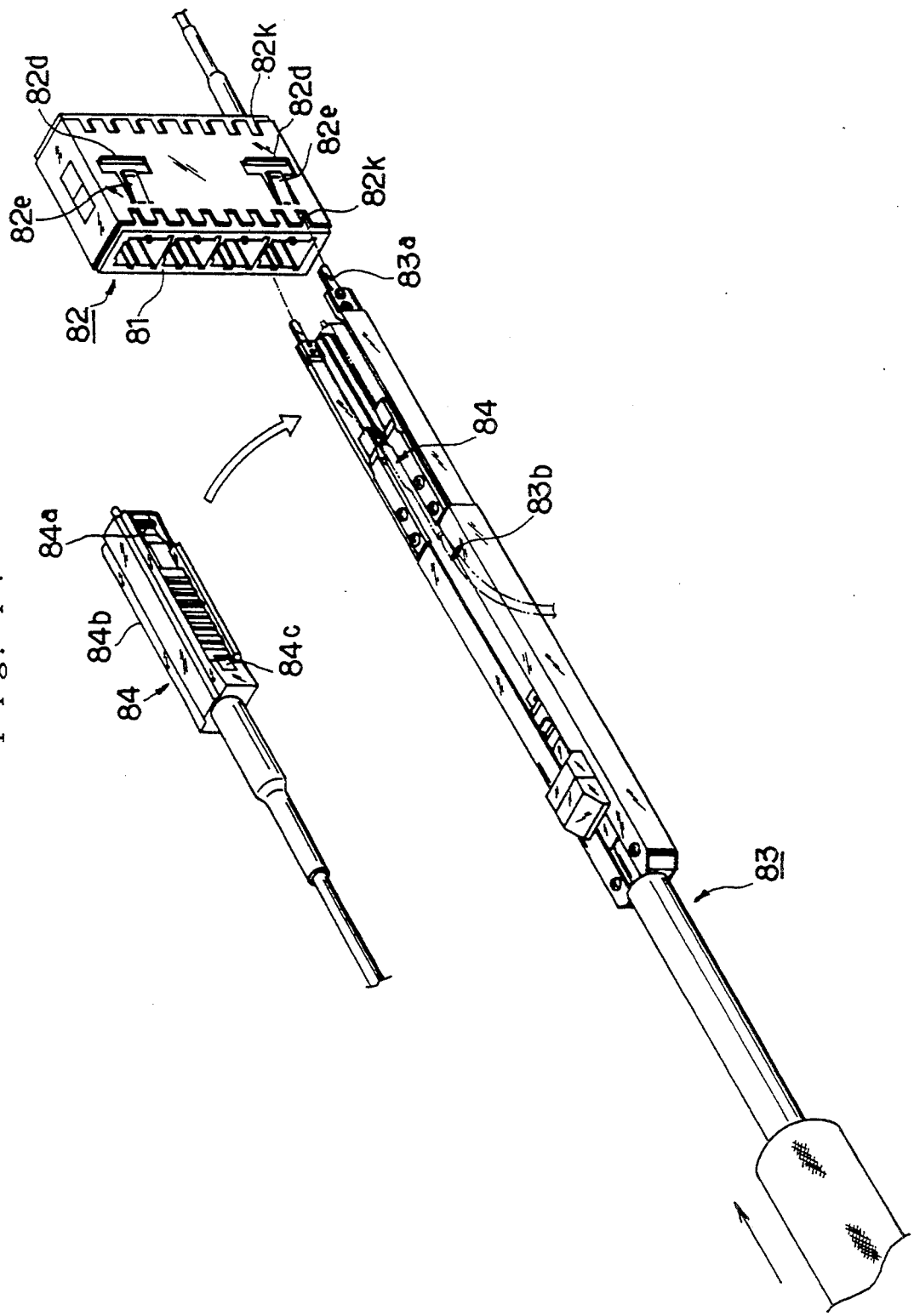
FIG. 17 is a perspective view showing a further embodiment of the panel fitting of the present invention and the manner in which a plug is inserted into the connector by using a plug inserter/remover.

Although two projections 82$d$ are formed and one spring piece 82$e$ is formed in a position which is equally far from the projections 82$d$ in the present embodiment, there may be one projection 82$d$ and one spring piece 82$e$ or the same number of projections 82$d$ and spring pieces 82$e$ in pair as shown in FIG. 17.

Figure 15:
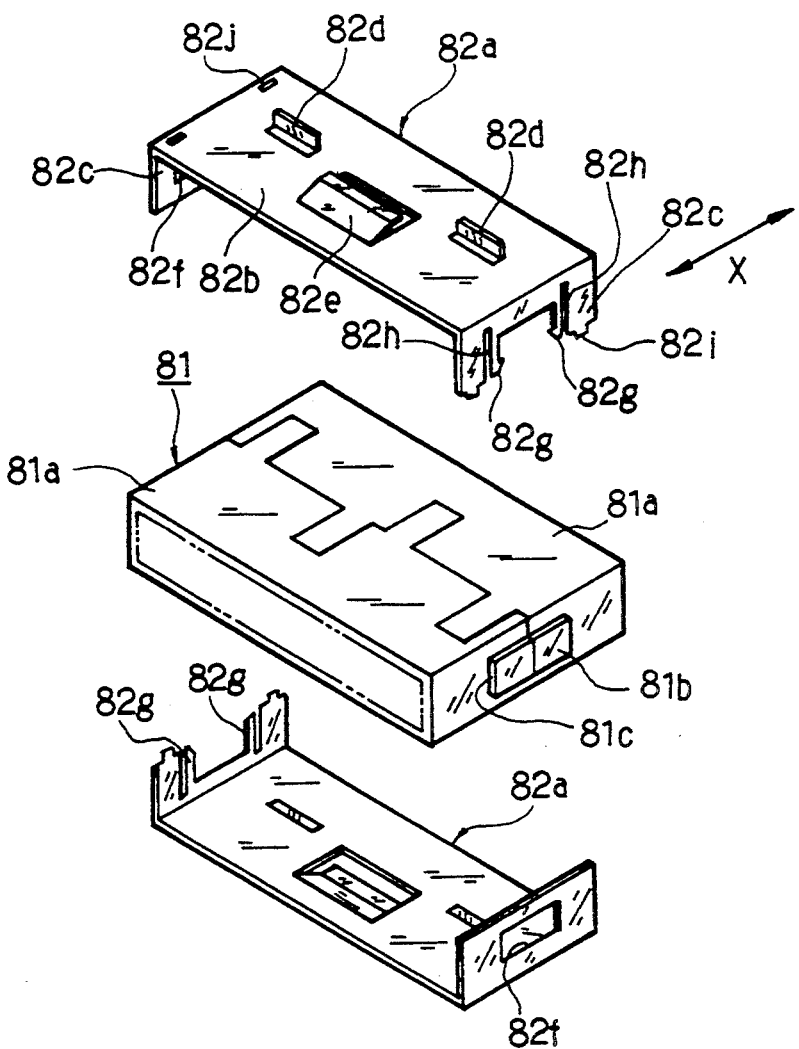
FIG. 15 is an exploded perspective view showing a further embodiment of the panel fitting of the present invention which is used for securing the adapter for the optical connector to the panel.
Figure 16:
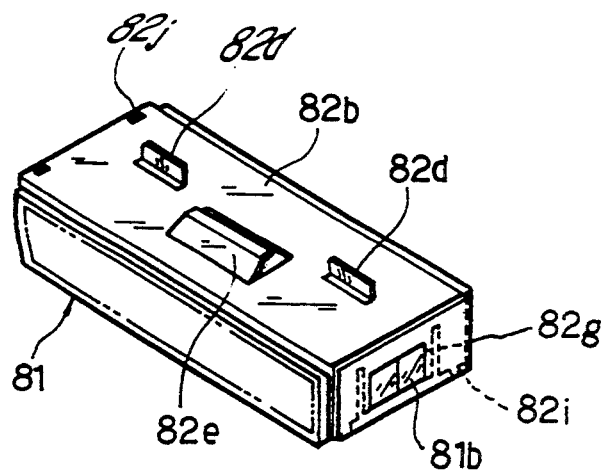
FIG. 16 is a perspective view showing the panel fitting of FIG. 15 which is secured to the adapter for the optical connector.

Referring now to FIGS. 15 and 16, there is shown an alternative of a panel fitting for inserting into and securing the adapter of the present invention to a panel.

In the embodiment, each plate member 82$a$ is formed on one side 82$c$ with an engaging recess 82$f$ which is identical with that of the foregoing embodiment and is formed on the other side 82$c$ with a pair of hooking pawls 82$g$ for elastically holding the both edges of the engaging projections 81$b$ of the adapter 81. The pair of hooking pawls 82$g$ are formed by cutting fine slits in the side 82$c$ and are elastically held from the side 82$c$ in a cantilever manner.

Since the pair of hooking pawls 82$g$ are inserted into the channels 81$c$ formed on the both sides of the engaging projections 81$b$, the clearance in the channel 81$c$ which is otherwise formed when the plate member 82$a$ of FIG. 9 is inserted to the adapter 81 is not yielded. Accordingly, the plate member 82$a$ in FIG. 15 can be firmly secured to the adapter 81. If the plate member 82$a$ can be firmly secured to the adapter 81 against the moment M, the projection 82$i$ and holes 82$j$ may be omitted.

Referring now to FIG. 17, there is shown a further embodiment of the panel fitting of the present invention. The illustrated panel fitting 82 is substantially identical with the panel fitting shown in FIGS. 15 and 16 except that a number of grooves 82$k$ are formed along the edge of the plate member 82$a$. Accordingly, the same or similar components are represented by the same reference numerals.

The panel fitting 82 is used in combination with a plug inserter/remover 83 having a pair of guides 83$a$.

In other words, the pair of guides 83$a$ of the plug inserter remover 83 is inserted into a predetermined groove 82$k$ of the panel fitting 82 to link therewith. Thereafter, a main body 83$b$ of the inserter/remover 83 which holds the plug 84 is slid to a predetermined position of a pair of elastic pawls of the adapter. This causes a pair of elastic pawls to snap engage with engaging portions 84$a$ formed on the opposite sides of the plug 84 so that the plug 84 is linked to the adapter. On the other hand, in order to remove a given plug 84 away from the adapter, the pair of the guides 83$a$ of the plug inserter/remover 83 are inserted into the grooves 82$k$ in position of the panel fitting 82 to link therewith similarly to mounting and thereafter the unloaded main body 83 is slid to the positions of a given pair of elastic pawls of the adapter.

Subsequently, a pair of fingers (not shown) provided on the plug inserter remover 83 are brought into an engagement with engaging holes 84$c$ formed on the sides of the sliding frame 84$b$ of the plug 84.

Removal of the plug inserter remover 83 from the adapter causes the sliding frame 84$b$ to move relative to the plug to expand the pair of the elastic pawls of the adapter for disengaging with the engaging portions 84$a$ formed on the opposite sides of the plug 84. In this state, the plug inserter remover 83 is removed to separate the plug 84 away from the adapter.

Figure 18:
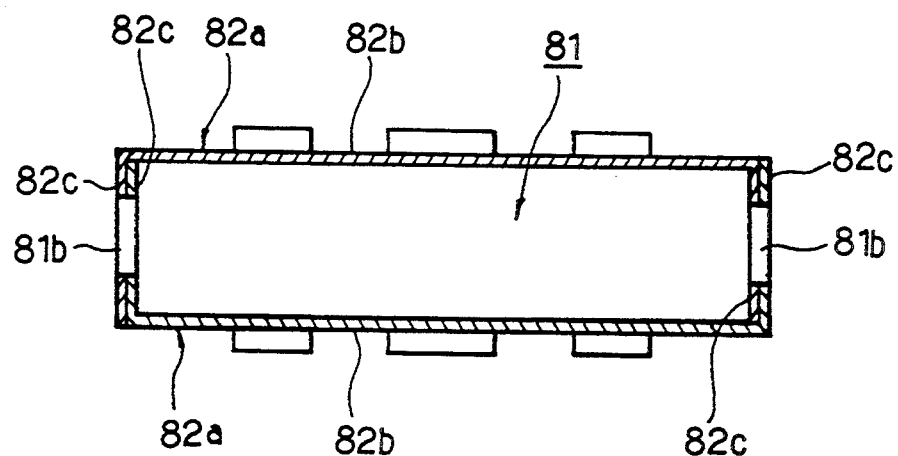
FIG. 18 is a longitudinal sectional view showing an embodiment of the assembled panel fitting and the adapter for the optical connector.

Referring now to FIGS. 18 and 19, there are schematically shown two structures for fitting a pair of plate members 82$a$ to the adapter 81.

FIG. 18 shows a structure which is adopted in the embodiments shown in FIGS. 9 to 17. An engaging projection 81 is provided on each side of the adapter 81, which is fitted to fitting recesses 82$f$ of the overlapped sides 82$c$ of the pair of plate members 82$a$. Accordingly, the pair of plates 82$a$ are secured to the adapter 81 in a staggered manner.

FIG. 19 shows a structure which is adopted in the embodiment of FIG. 2 (the panel fitting is not illustrated) in which two engaging projections 81$b$ are provided on each side of the adapter 81. The sides of each panel plates 82$a$ are fitted to the corresponding engaging projections 81$b$ therefor, respectively.

A panel fitting for securing an adapter for the optical connector to a surface of a panel (a surface mount type panel fitting) will be described with reference to FIGS. 20 to 26.

Figure 20:
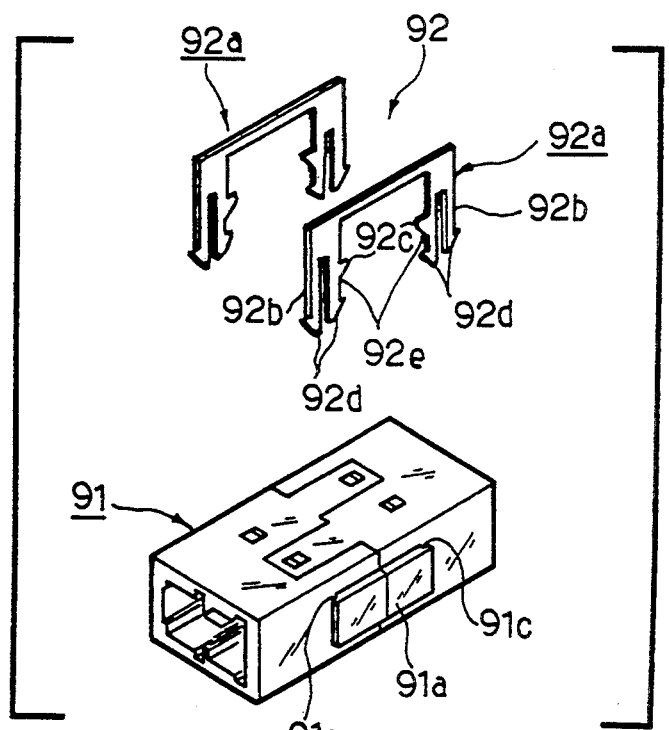
FIG. 20 is an exploded perspective view showing a further embodiment of the panel fitting of the present invention which is used for securing the adapter for the optical connector to the panel.
Figure 21:
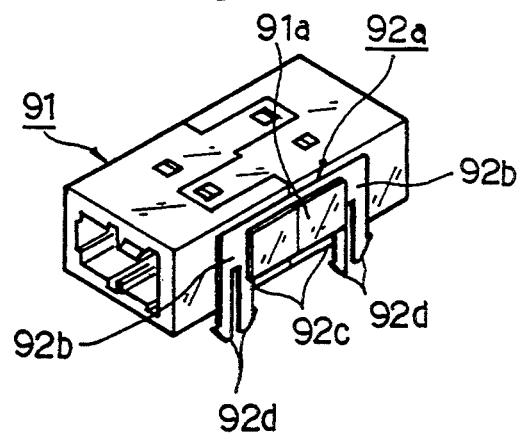
FIG. 21 is a perspective view showing the panel fitting of FIG. 20 which is secured to the adapter for the optical connector.
Figure 22:
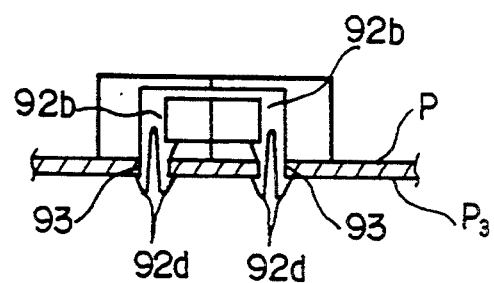
FIG. 22 is a sectional view showing the adapter for the optical connector which is secured to the panel by means of the panel fitting of FIG. 21.

Referring now to FIGS. 20 to 22, there is shown an embodiment of such a panel fitting. The panel fitting 92 comprises a pair of reversed U-shaped members 92$a$ which are identical in shape, A pair of elastic legs 92$b$ of each reversed U-shaped member 92$a$ is formed with a hooking pawl 92$c$ for elastically holding two lower opposite corners of the engaging projection 91$a$ formed on the side of the adapter 91. The engaging projections 91$a$ formed on the sides of the adapter 91 are engaged with and secured to the reversed U-shaped member 92$a$ by means of the inner peripheral wall of the reversed U-shaped member 92$a$ and the pair of the hooking pawls 92$c$.

Figure 13A:
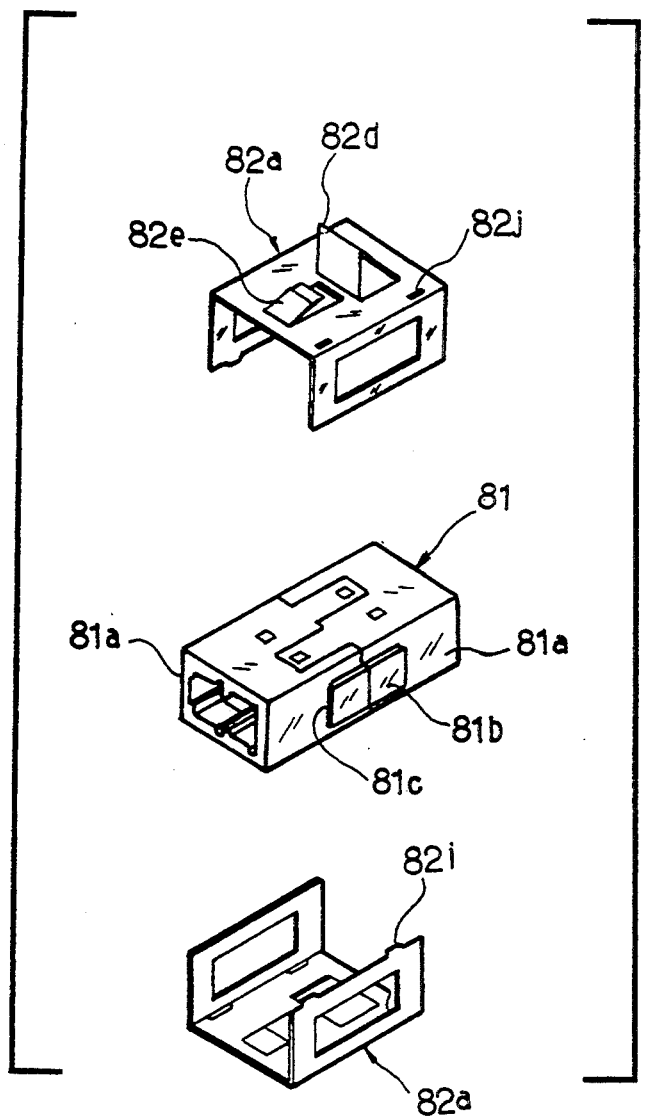
FIG. 13(a) is an exploded perspective view showing another panel fitting of the present invention which is used for securing the adapter for the optical connector to the panel.
Figure 13B:
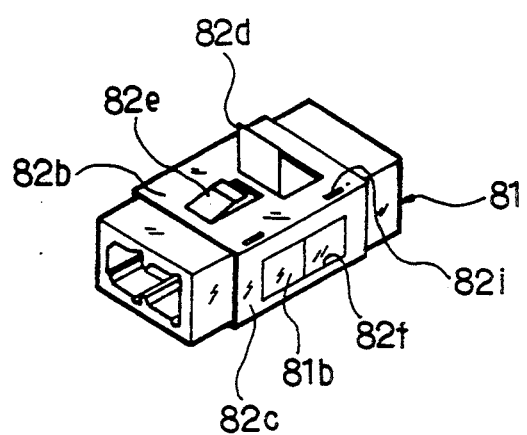
FIG. 13(b) is a perspective view showing the panel fitting of FIG. 13(a) which is secured to the adapter for the FIG. 14 is a perspective view showing a further embodiment of a which is used for securing the adapter for the optical connector to the panel.
Figure 14:
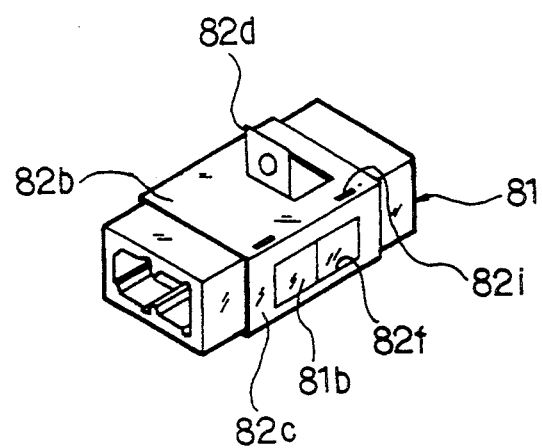

The engaging projection 91$a$ formed on the side of the adapter 91 is identical in shape with the engaging projection 81$b$ shown in FIGS. 9 and 13. The engaging projections 81$b$ are formed with two channels 91$c$ along the outer vertical sides thereof. Since the panel fitting 92 is inserted into the channels 91$c$ and secured thereto, the panel fitting 92 will not be disengaged with the adapter 91.

The pair of elastic legs 92$b$ of each reversed U-shaped member 92$a$ are formed at the lower ends with hooking pawls 92$d$ which are hooked on the lower side P3 of the panel P when the legs 92$b$ are inserted into mounting holes 93 formed through the panel P. The panel P is gripped between the lower inclined faces 92$e$ of hooking pawls 92$c$ and hooking pawls 92$d$ formed at the pair of elastic legs 92$b$ so that the panel fitting 92 is firmly secured to the panel P.

In order to secure the adapter 91 on the panel P by means of such a panel fitting 92, reversed U-shaped members 92$a$ are lowered along the sides of the adapter 91. The lower inclined sides 92$e$ of the hooking pawls 92$c$ formed on the reversed U-shaped member 92$a$ are lowered along the channels 91c on both sides of the engaging projections 91a formed on each side of the adapter 91. This causes the pair of the elastic legs 92b of the reversed U-shaped member 92a to expand outwardly and then to return to initial positions inwardly after fitting of the hooking pawls 92c to the lower corners of the engaging projections 91a. The adapter 91 is thus firmly secured to the lower corners of the panel fitting 92.

Subsequently, the hooking pawls 92d formed at the lower ends of the elastic legs 92b can be hooked on the lower side P3 of the panel P by inserting the hooking pawls 92d into mounting holes 93 formed through the panel P.

Figure 23:
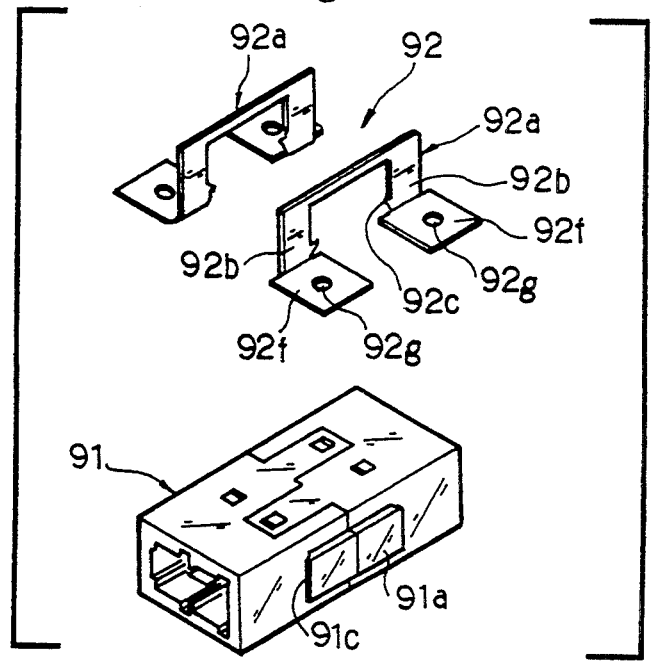
FIG. 23 is an exploded perspective view showing a further embodiment of the panel fitting of the present invention which is used for securing the adapter for the optical connector to the panel.
Figure 24:
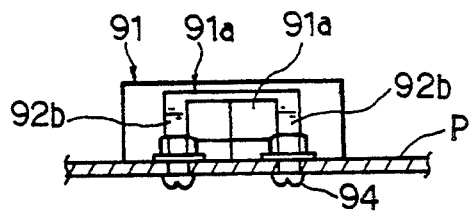
FIG. 24 is a sectional view showing the adapter for the optical connector which is secured to the panel by means of the panel fitting of FIG. 23.

Referring now to FIGS. 23 and 24, there is shown a further embodiment of a panel fitting for securing the adapter 91 on a surface of a panel.

A reversed U-shaped member 92a which forms such a panel fitting 92 is different from the panel fitting 92 shown in FIGS. 20 to 22 in that the member is formed at the lower ends of a pair of elastic legs 92b with fixing plates 92f each having a screw hole 92g in lieu of hooking pawls 92d.

Such panel fitting 92 is secured to the panel P by means of screws 94 or rivets and the like.

Figure 25:
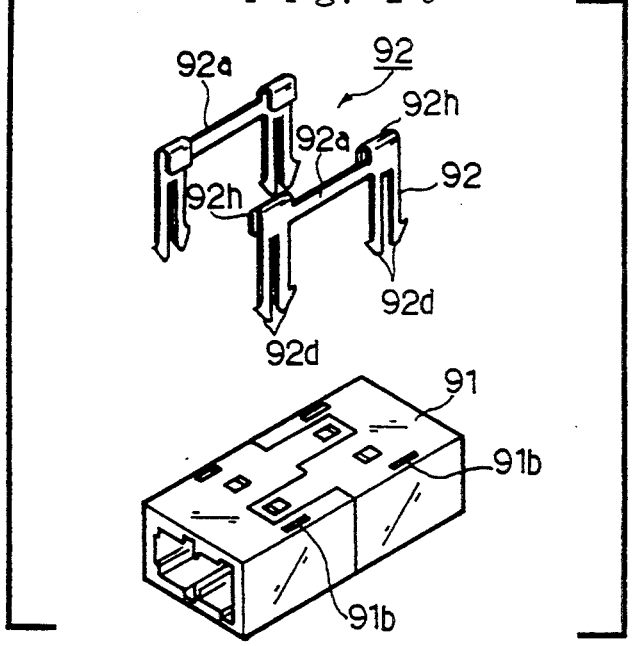
FIG. 25 is an exploded perspective view showing a further embodiment of the panel fitting of the present invention which is used for securing the adapter for the optical connector to the panel.

Referring now to FIG. 25, there is shown a further embodiment of a panel fitting for securing the adapter 91 to a surface of a panel.

A reversed U-shaped member 92a which forms such a panel fitting 92 is different from the panel fitting 92 shown in FIGS. 19 to 21 in that the member 92a is formed on the upper edge with a pair of U-bent lips 92h.

The U-bent lips 92h are pressure-fitted into a pair of engaging recesses 91b which are formed along the side edge on the upper face of the adapter 91. This causes the reversed U-shaped member 92a to be firmly secured to the adapter 91.

Referring now to FIG. 26, there is shown a further embodiment of panel fitting.

The panel fitting 92 comprises a pair of reserved U-shaped members 92a having an identical shape and a pair of linking members 92i and a linking member 92j which link the reversed U-shaped members 92a.

The adapter 91 is formed on opposite sides with engaging projections 91a corresponding to the engaging projections 67 of FIG. 1(b).

In order to secure the adapter 91 to the panel P by means of this panel fitting 92 the panel fitting 92 is pressed upon the adapter 91. This causes the reversed U-shaped member 92a to elastically expand so that the linking members 92j are inserted into spaces 91m between the engaging projections 91a of the adapter 91. Thus, the panel fitting 92 is firmly secured to the adapter 91.

Then, the hooking pawls 92d formed at the lower ends of the elastic legs 92b can be hooked on the lower surface P3 by inserting the hooking panels 92d into mounting holes 93 formed through the panel P. This firmly secures an assembly of the panel fitting 92 and the adapter 91 to the panel P.

Either of the plate members 82a shown in FIGS. 9 to 14 and the reversed U-shaped members 92a shown in FIGS. 20 to 26 can be secured to the same adapters (the adapter 81 shown in FIGS. 9 to 14 and adapter 91 shown in FIG. 20 to 23) to be mounted on the panel.

In such a manner, mounting of various panel fitting on the basic adapters makes it possible to insert and secure the adapters on the panel and to secure the adapters to the surface of the panel.

The adapter of the present invention can be mounted on a panel at a high density since the adapter main body has no flange even if a panel fitting is secured to the adapter.

Figure 27:
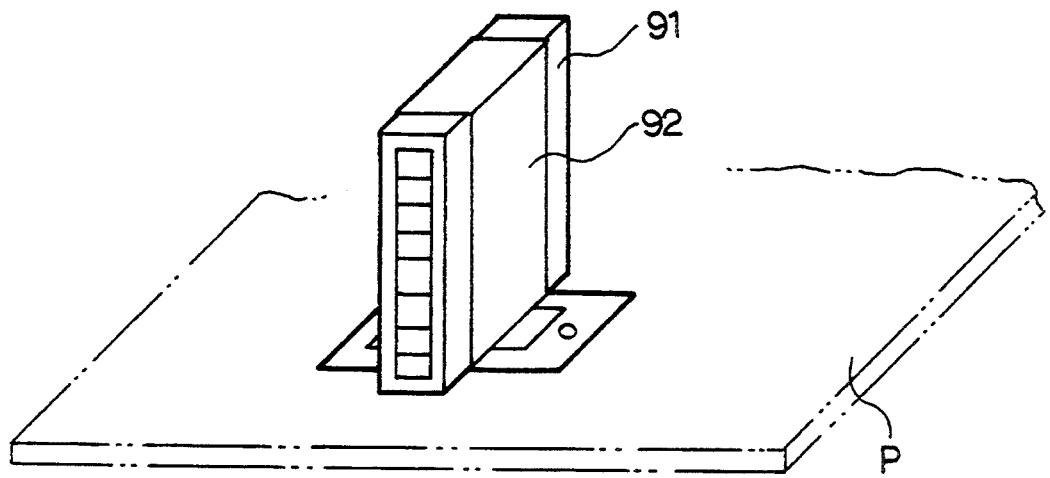
FIG. 27 is a perspective view showing a way in which the panel fitting of the present invention is used.
Figure 28:
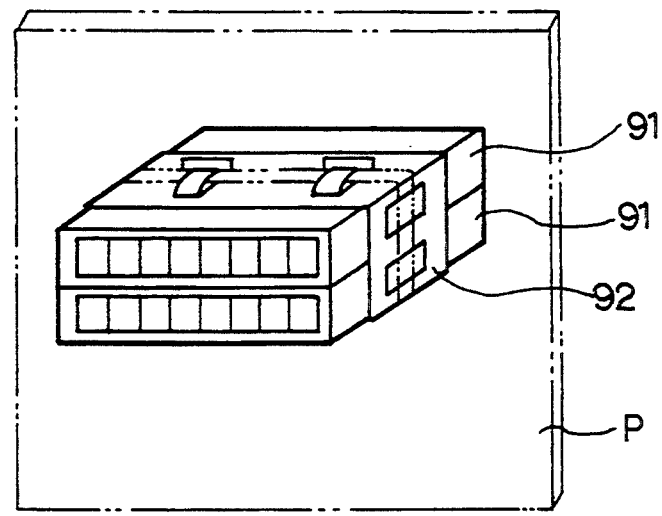
FIG. 28 is a perspective view showing another way in which the panel fitting of the present invention is used.
Figure 29A:
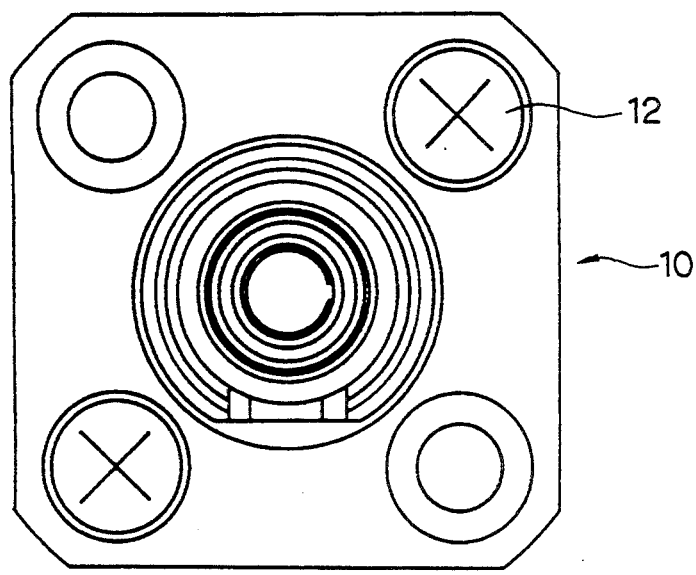
FIGS. 29(a) and 29(b) are plan view and a front view half in section, respectively, showing an adapter for the optical connector which is assembled by conventional screwing for connecting a pair of optical fibers.
Figure 29B:
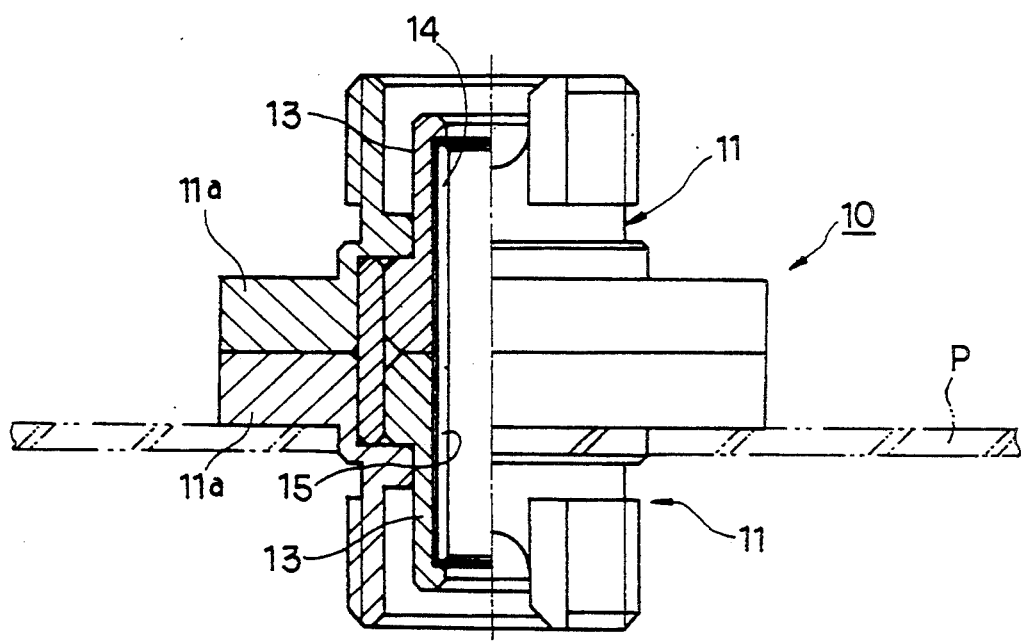
Figure 30A:
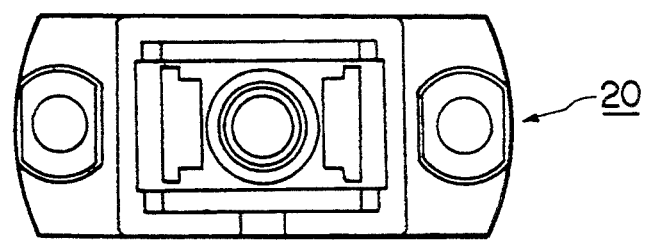
FIGS. 30(a) and 30(b) are plan view and a front view half in section, respectively, showing an adapter for the optical connector which is assembled by conventional caulking for connecting a pair of optical fibers.
Figure 30B:
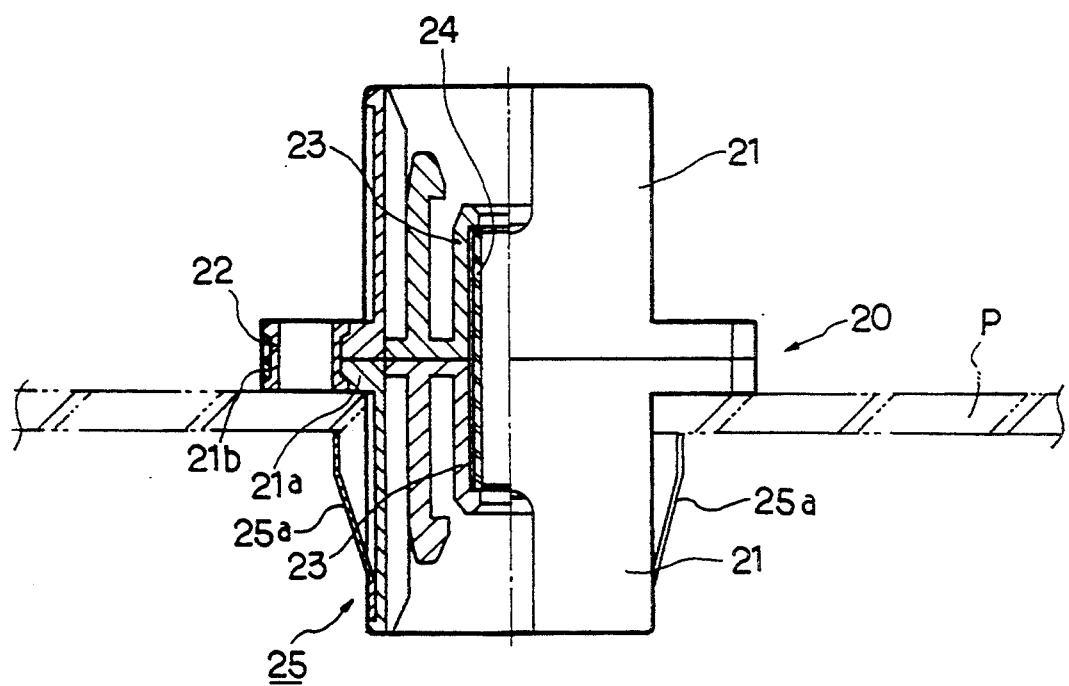
Figure 31A:
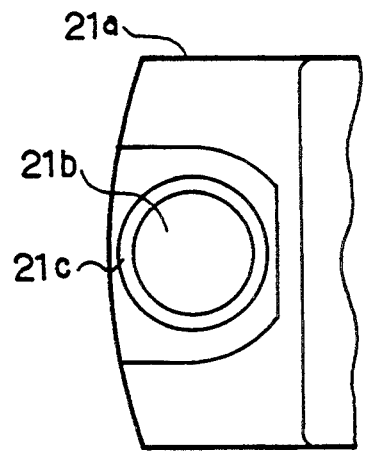
FIGS. 31(a) and 31(b) are plan and longitudinal sectional views, respectively, showing the periphery of the flanges of the housings which are used in the adapter of FIG. 30.
Figure 31B:
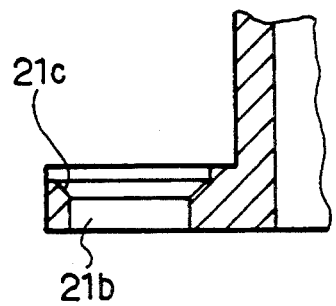
Figure 32A:
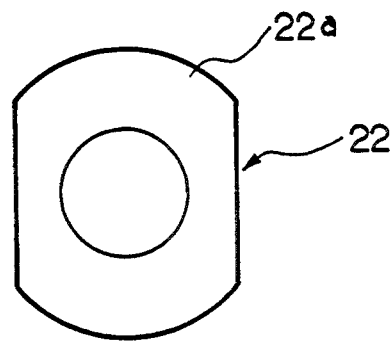
FIGS. 32(a) and 32(b) are plan and half sectional and front view, respectively, showing a caulking ring which is used in the adapter of FIG. 30.
Figure 32B:
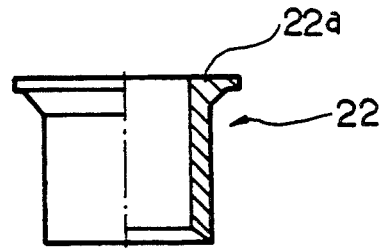
Figure 33A:
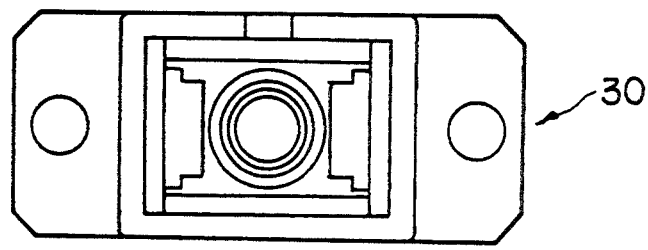
FIGS. 33(a) to 33(c) are plan, front view half in section showing an adapter for the optical connector which is assembled by conventional ultrasonic welding, and a bottom view showing an abutting surface of a housing, respectively.
Figure 33B:
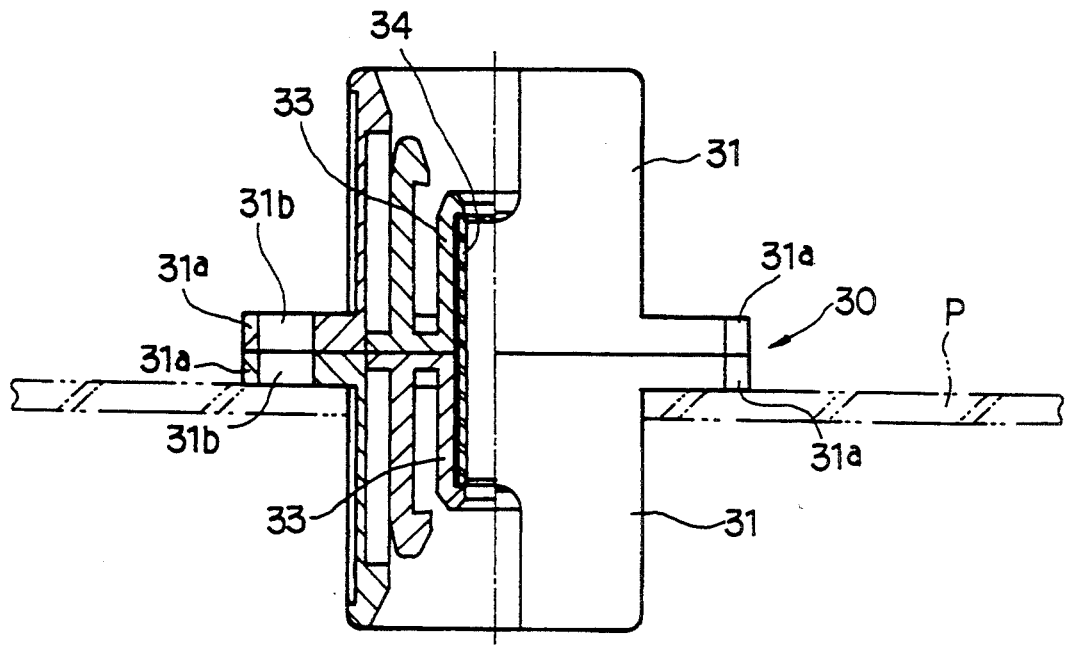
Figure 33C:
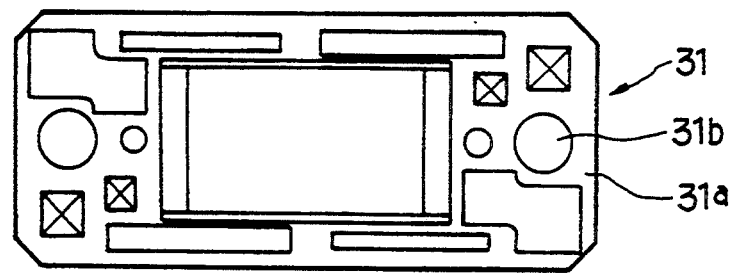
Figure 34A:
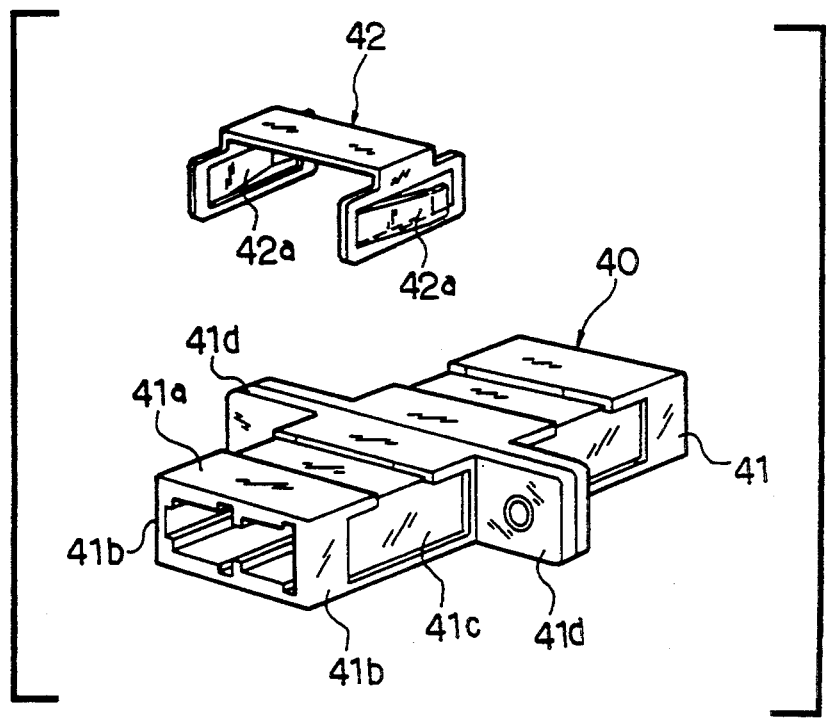
FIGS. 34(a) and 34(b) are perspective and elevational views, respectively, showing another structure for securing the adapter for the optical connector to an optical fiber wiring panel.
Figure 34B:
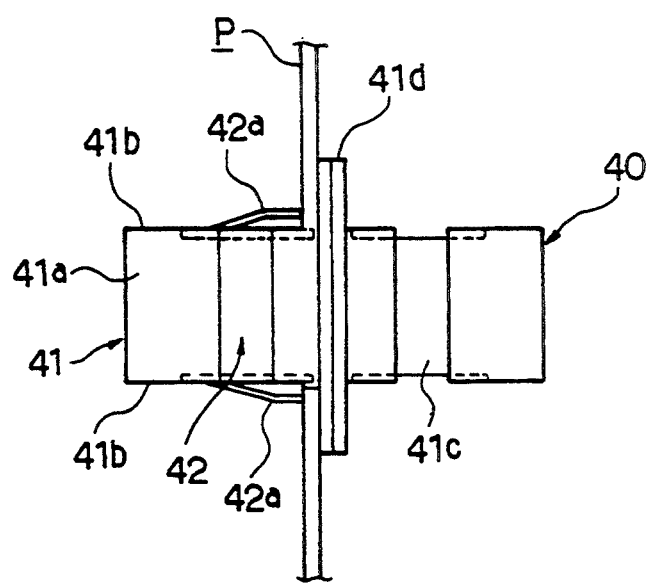

Mounting of adapter 91 on a panel in a longitudinal directions as shown in FIG. 27 and high density mounting of a plurality of adapter 91 as shown in FIG. 28 is possible since the adapter 91 has a high versatility and high density mounting is possible.

Although the present invention has been described by way of illustrated preferred embodiments, the present invention is not limited to these embodiments. It is to be understood that various modifications and alternations are possible without departing from the spirit and scope of the invention as defined in the following claims.

What is claimed is:

1. An adapter for an optical connector for connecting two opposing optical plugs comprising:
   a sleeve holder holding an alignment sleeve therein, said alignment sleeve having opposite sleeve sides into which ferrules of the opposing optical plugs to be connected are respectively inserted such that the ferrules are aligned with each other, and said sleeve holder having flange means protruding from an external surface of said sleeve holder;
   a first adapter element having walls defining a space on an outward side thereof for receiving one of the optical plugs therein and a space on an inward side thereof for holding a first part of said sleeve holder therein;
   a second adapter element facing opposite to said first adapter element and having walls defining a space on an outward side thereof for receiving the other of the opposing optical plugs therein and a space on an inward side thereof for holding a second part of said sleeve holder therein; and
   said first and second adapter elements each having complementary snap-engaging means provided respectively on their inward sides for securing said first and second adapter elements in a snap-engagement fitting to each other,
   wherein said first and second adapter elements each have seat means for holding the flange means of said sleeve holder therebetween to retain the sleeve holder so that the first and second parts thereof are in a float-like condition inside the spaces of said first and second adapter elements when the adapter elements are secured to each other.

2. An adapter for an optical connector as defined in claim 1, in which said sleeve holder has flange means radially protruding from the circumference thereof; and
   said first and second adapter elements have respective seat means for pinching the flange means of said sleeve holder therebetween to retain the sleeve holder in a float-like condition inside the spaces of said first and second adapter elements when the adapter elements are secured to each other, said seat means having a profile complementary to the flange means of the sleeve holder.

3. An adapter for an optical connector for connecting two opposing optical plugs comprising:
   a sleeve holder holding an alignment sleeve therein, said alignment sleeve having opposite sleeve sides into which ferrules of the opposing optical plugs to be connected are respectively inserted such that the ferrules are aligned with each other;

a first adapter element having walls defining a space on an outward side thereof for receiving one of the optical plugs therein and a space on an inward side thereof for holding a first part of said sleeve holder therein;

a second adapter element facing opposite to said first adapter element and having walls defining a space on an outward side thereof for receiving the other of the opposing optical plugs therein and a space on an inward side thereof for holding a second part of said sleeve holder therein; and said first and second adapter elements each having complementary snap-engaging means provided respectively on their inward sides for securing said first and second adapter elements in a snap-engagement fitting to each other, wherein each of said first and second adapter elements has a first thin elastic engaging piece having an engaging protuberance thereon, said first engaging piece projecting in an inserting direction from one of two opposing sides of the adapter element which are normal to an abut face of the adapter element facing toward the other adapter element, and a complementary first recess into which the protuberance of the first engaging piece of the other adapter element is fitted when the adapter elements are engaged to each other.

4. An adapter for an optical connector for connecting two opposing optical plugs, comprising:

a sleeve holder holding an alignment sleeve therein, said alignment sleeve having opposite sleeve sides into which ferrules of the opposing optical plugs are respectively inserted such that the ferrules are aligned with each other;

a first adapter element having walls defining a space on an outward side thereof for receiving one of the optical plugs therein and a space on an inward side thereof for a first part of said sleeve holder therein;

a second adapter element facing opposite to said first adapter element and having walls defining a space on an outward side thereof for receiving the other of the opposing optical plugs therein and a space on an inward side thereof for holding a second part of said sleeve holder therein; and wherein each of said first and second adapter elements has first and second thin elastic engaging pieces having engaging protuberances thereon, said first and second engaging pieces projecting in an inserting direction from two opposing sides of the adapter element which are normal to an abut face of the adapter element facing toward the other adapter element, and complementary first and second recesses formed on the two opposing sides adjacent to extension lines of the first and second engaging pieces of the adapter element into which the protuberances of the first and second engaging pieces of the other adapter element are fitted when the first and second adapter elements are engaged to each other.

5. An adapter for an optical connector as defined in claim 4, wherein each adapter element has a third thin elastic engaging piece having an engaging protuberance thereon, said third engaging piece projecting in an inserting direction from one of another two opposing sides of the adapter element which are normal to the abut face of the adapter element facing toward the other adapter element, and a complementary third recess into which the protuberance of the first engaging piece of the other adapter element is fitted when the adapter elements are engaged to each other.

6. An adapter for an optical connector as defined in claim 1, wherein said complementary snap-engaging means have contact faces which are slightly inclined in a biting direction relative to a line normal to a snap-engagement direction of said first and second adapter elements.

7. An adapter for an optical connector as defined in claim 1, wherein said first and second adapter elements have respective abut faces formed with opposing press fit holes, and said adapter elements are secured to each other by reinforcing pins inserted into the opposing press fit holes.

8. An adapter for an optical connector for connecting two opposing optical plugs, comprising:

a sleeve holder having a pair of complementary sleeve holder elements which are press fitted to each other so as to be immovable relative to each other, an alignment sleeve held in said sleeve holder into which ferrules of the opposing optical plugs to be connected are inserted from opposite sides thereof such that the ferrules are aligned with each other, and flange means provided radially protruding from an external circumferential surface of said sleeve holder; and first and second adapter elements opposing each other having walls defining spaces for receiving respective ones of the opposing optical plugs therein and for holding respective parts of said sleeve holder therein, said first and second adapter elements having seat means for pinching the flange means of said sleeve holder therebetween to retain the sleeve holder in a float-like condition inside the spaces of said first and second adapter elements when the adapter elements are secured to each other, said seat means having a profile complementary to the flange means of the sleeve holder.

9. An adapter for an optical connector as defined in claim 8 in which the sleeve holder is disposed in a float-like condition between the adapter elements when they are secured to each other and is movable within a predetermined range under an outer load.

10. A combination of an adapter for an optical connector and a fitting for securing the optical connector to a panel wherein the adapter has a rectangular shape with a pair of opposing sides which are normal to the panel and projection means formed on each of the pair of opposing sides, and the fitting has enaging means for engaging the projection means on the two opposing sides of the adapter and securing means for securing the fitting with the adapter engaged therewith to the panel, said adapter having a sleeve holder for holding an alignment sleeve therein having opposite sleeve sides into which ferrules of opposing optical plugs to be connected are respectively inserted such that the ferrules are aligned with each other, said sleeve holder having flange means protruding from an external surface thereof, a first adapter element having walls defining a space on an outward side thereof for receiving one of the optical plugs therein and a space on an inward side thereof for holding a first part of said sleeve holder therein, a second adapter element facing opposite to said first adapter element and having walls defining a space on an outward side thereof for receiving the other of the opposing optical plugs therein and a space on an inward side thereof for holding a second part of said sleeve holder therein, and said first and second adapter elements each having seat means for holding the flange means of said sleeve holder therebetween to retain the sleeve holder so that the first and second parts thereof are in a float-like condition inside the spaces of said first and second adapter elements when the adapter elements are secured to each other, and said adapter having said first and second adapter elements secured to each other to form a single module and being secured to the panel in a single operation of engaging the fitting to the adapter module on the two opposing sides thereof and securing the fitting to the panel.

11. An adapter and fitting combination for an optical connector as defined in claim 10, wherein said adapter has a longitudinal axis in a direction for connecting two opposing optical plugs, and said projection means comprise a projection formed in a center position on each of said two opposing sides of said adapter, each of said projections being formed with channels on opposite edge surfaces thereof which are normal to the longitudinal axis of said adapter for engaging said fitting means.

12. An adapter and fitting combination for an optical connector as defined in claim 10, wherein said adapter has a longitudinal axis in a direction for connecting two opposing optical plugs, and said projection means comprise two thin elongate projections formed on each of said two opposing sides of said adapter which are symmetric relative to a center position of the adapter side, each of said projections being formed with channels on opposite edge surfaces thereof which are normal to the longitudinal axis of said adapter for engaging said fitting means.

13. A combination of a rectangular-shaped adapter for an optical connector and a panel fitting for securing the adapter to a panel having an opening into which said adapter and panel fitting combination is inserted and secured to the panel, comprising:

said adapter having a sleeve holder for holding an alignment sleeve therein having opposite sleeve sides into which ferrules of opposing optical plugs to be connected are respectively inserted such that the ferrules are aligned with each other, said sleeve holder having flange means protruding from an external surface thereof, a first adapter element having walls defining a space on an outward side thereof for receiving one of the optical plugs therein and a space on an inward side thereof for holding a first part of said sleeve holder therein, a second adapter element facing opposite to said first adapter element and having walls defining a space on an outward side thereof for receiving the other of the opposing optical plugs therein and a space on an inward side thereof for holding a second part of said sleeve holder therein, and said first and second adapter elements each having seat means for holding the flange means of said sleeve holder therebetween to retain the sleeve holder so that the first and second parts thereof are in a float-like condition inside the spaces of said first and second adapter elements when the adapter elements are secured to each other, and said panel fitting having a pair of U-shaped plate members which are combined from two opposing sides of the adapter to sandwich the adapter therebetween, each of said plate members including a base portion abutting one of the opposing sides of the adapter and first and second side portions integrally formed at opposing sides of the base portion;

fitting means provided on said first and second side portions of each of said plate members for holding said plate members to the adapter such that the adapter does not drop off from the panel fitting; and securing portions formed on said plate members for securing the panel fitting holding the adapter in an opening in the panel.

14. A combination of adapter and panel fitting as defined in claim 13, wherein said securing portions of said plate members include a projection piece which abuts one side of an opening in the panel, and a spring piece which is formed in a position opposite to the projection piece and abuts another side of the opening in the panel, thereby exerting a pinching force between the projection piece and the spring piece to secure the adapter in the opening in the panel.

15. A combination of adapter and panel fitting as defined in claim 13, wherein said securing portions of said plate members include a projection piece which abuts one side of the opening in the panel, said projection piece having a hole in which a screw or rivet is inserted to secure the panel fitting to the side of the opening in the panel.

16. A combination of adapter and panel fitting as defined in claim 13, wherein said first and second side portions of said plate members overlap on another two opposing sides of the adapter, and said fitting means of said plate members includes recesses formed in said first and second side portions of said plate members into which projections formed at the other two opposing sides of the adapter are inserted.

17. A combination of adapter and panel fitting as defined in claim 13, wherein said first and second side portions of said plate members overlap on another two opposing sides of the adapter, and said fitting means of said plate members includes a recess formed at said first side portions into which a projection formed at a first one of the other two opposing sides of the adapter are inserted, and a pair of hooking pawls formed on said second side portions of said plate members for resiliently holding opposite side edges of another projection formed at a second one of the other two opposing sides of the adapter.

18. A combination of adapter and panel fitting as defined in claim 13, wherein each of said plate members is formed with two spaced apart projections at distal ends of its second side portion and with two holes at an intersecting line between its base portion and its first side portion into which the projections on the second side portion of the other plate member are inserted when the plate members are combined, said projections being fitted in said holes in at least four distal end positions when said plate members are combined to sandwich the adapter.

19. A combination of adapter and panel fitting as defined in claim 14, wherein a projection piece and a spring piece are formed on the base portions of each one of said plate members corresponding to those of the other plate member.

20. A combination of adapter and panel fitting as defined in claim 14, wherein a plurality of projection pieces aligned with each other and a spring piece having a width corresponding to the plurality of projection pieces are formed on the base portions of each one of said plate members corresponding to those of the other plate member.

21. A combination of adapter and panel fitting as defined in claim 13, further including guide grooves for guiding an optical plug inserter/remover, said guide grooves being formed at an edge of the panel fitting adjacent to an opening thereof through which an optical plug is to be inserted in the adapter.

22. A combination of a rectangular-shaped adapter for an optical connector and a panel fitting for securing the adapter on a surface of a panel formed of a thin plate which abuts a side of the adapter, said adapter having a sleeve holder for holding an alignment sleeve therein having opposite sleeve sides into which ferrules of opposing optical plugs to be connected are respectively inserted such that the ferrules are aligned with each other, said sleeve holder having flange means protruding from an external surface thereof, a first adapter element having walls defining a space on an outward side thereof for receiving one of the optical plugs therein and a space on an inward side thereof for holding a first part of said sleeve holder therein, a second adapter element facing opposite to said first adapter element and having walls defining a space on an outward side thereof for receiving the other of the opposing optical plugs therein and a space on an inward side thereof for holding a second part of said sleeve holder therein, and said first and second adapter elements each having seat means for holding the flange means of said sleeve holder therebetween to retain the sleeve holder so that the first and second parts thereof are in a float-like condition inside the spaces of said first and second adapter elements when the adapter elements are secured to each other, and said panel fitting having holding means for detachably holding the adapter to the panel fitting and a securing portion disposed at an end thereof for securing the panel fitting to the panel.

23. A combination of adapter and panel fitting as defined in claim 22, wherein said securing portion of said panel fitting includes holes through which screws or rivets are inserted for securing the panel fitting to the panel.

24. A combination of adapter and panel fitting as defined in claim 22, wherein said securing portion of said panel fitting comprises one or more elastic legs having hooking pawls which are to be inserted through mounting holes in the panel.

25. A combination of adapter and panel fitting as defined in claim 24, wherein said panel fitting comprises a pair of discrete reversed U-shaped members of identical shape formed with elastic leg portions which are disposed at respective opposing sides of said thin plate, and said holding means comprises a pair of hooking pawls on said elastic legs of said reversed U-shaped members for engaging and holding a projection formed on the side of the adapter abutting the thin plate.

26. A combination of adapter and panel fitting as defined in claim 24, wherein said panel fitting comprises a pair of discrete reversed U-shaped members of identical shape which are disposed at respective opposing sides of said thin plate, and said holding means comprises a pair of U-shaped bent tongues formed at an apex position of each of said reversed U-shaped members for press fitting into recesses formed along an edge on the side of the adapter abutting the thin plate.

27. A panel fitting for securing a rectangular-shaped adapter for an optical connector on a surface of a panel formed of a thin plate which abuts a side of the adapter, comprising:

holding means for detachably holding the adapter to the panel fitting and a securing portion disposed at an end thereof for securing the panel fitting to the panel, said securing portion including one or more elastic legs having hooking pawls which are to be inserted through mounting holes in the panel, and a pair of reversed channel-like members of identical shape for fitting over the adapter, each channel-like member being formed with a pair of elastic legs which abut two opposing sides of the adapter, and linking members linking the elastic legs of said pair of channel-like members on each of the two opposing sides of the adapter, and said holding means comprising said linking members being formed for resiliently engaging projections formed on the two opposing sides of the adapter.

* * * * *

UNITED STATES PATENT AND TRADEMARK OFFICE
CERTIFICATE OF CORRECTION

PATENT NO.   : 5,418,875
DATED        : May 23, 1995
INVENTOR(S)  : Nakano, Okamura, Iwano, Nagase, Kanayama, Ando, Kawahara, Furukawa, Matumoto, Nishiyama It is certified that error appears in the above-identified patent and that said Letters Patent is hereby corrected as shown below:

On the title page: Item [75]    Inventors' names:
After "Akira Kawahara" correct the spelling of "Kokubhaji" to --Kokubunji--.
After "Takashi" correct the spelling of "Nighiyama" to --Nishiyama--.

Signed and Sealed this

Twenty-sixth Day of September, 1995

Attest:

BRUCE LEHMAN

Attesting Officer        Commissioner of Patents and Trademarks